(12) United States Patent
Kobayashi

(10) Patent No.: US 7,495,864 B2
(45) Date of Patent: Feb. 24, 2009

(54) PERPENDICULAR MAGNETIC RECORDING HEAD AND METHOD OF MANUFACTURING THE SAME

(75) Inventor: Kiyoshi Kobayashi, Niigata-ken (JP)

(73) Assignee: TDK Corporation Co., Ltd., Tokyo (JP)

( * ) Notice: Subject to any disclaimer, the term of this patent is extended or adjusted under 35 U.S.C. 154(b) by 360 days.

(21) Appl. No.: 11/369,666

(22) Filed: Mar. 6, 2006

(65) Prior Publication Data
US 2006/0203383 A1 Sep. 14, 2006

(30) Foreign Application Priority Data
Mar. 11, 2005 (JP) .............. 2005-068883

(51) Int. Cl.
*G11B 5/17* (2006.01)
(52) U.S. Cl. ............. 360/123.1; 360/123.02; 360/123.11
(58) Field of Classification Search ............ 360/123.02, 360/123.05, 123.09, 123.1, 123.11, 125.02
See application file for complete search history.

(56) References Cited

U.S. PATENT DOCUMENTS

| | | | | |
|---|---|---|---|---|
| 7,170,712 B2 * | 1/2007 | Sato | ...................... | 360/125.12 |
| 7,174,621 B2 * | 2/2007 | Sato et al. | ................. | 29/603.13 |
| 7,259,939 B2 * | 8/2007 | Sato | ........................... | 360/317 |
| 2002/0089783 A1 | 7/2002 | Matono | | |
| 2005/0083608 A1 * | 4/2005 | Watanabe | ................... | 360/126 |
| 2005/0185340 A1 * | 8/2005 | Kobayashi | ................. | 360/126 |

FOREIGN PATENT DOCUMENTS

| | | |
|---|---|---|
| JP | 05-242429 | 9/1993 |
| JP | 07-153026 | 6/1995 |
| JP | 09-016909 | 1/1997 |
| JP | 2002-170205 | 6/2002 |
| JP | 2004-295987 | 10/2004 |
| JP | 2004-296063 | 10/2004 |
| JP | 2004-362668 | 12/2004 |

* cited by examiner

*Primary Examiner*—William J Klimowicz
(74) *Attorney, Agent, or Firm*—Brinks Hofer Gilson & Lione

(57) ABSTRACT

A perpendicular magnetic recording head is provided that has a first coil layer is electrically connected to a second coil layer through contact layers. A laminator has a main magnetic pole layer and a gap layer which are formed between the first and second coil layers and above the contact layers. At both sides of the laminator, first insulating layers are formed. A second insulating layer is formed from a top surface of the laminator to top surfaces of the first insulating layers. An inclined surface is formed in each of the first insulating layers, and in the second insulating layer, the inclined surface is formed on the inclined surface of the first insulating layer.

4 Claims, 18 Drawing Sheets

FIG. 17
PRIOR ART
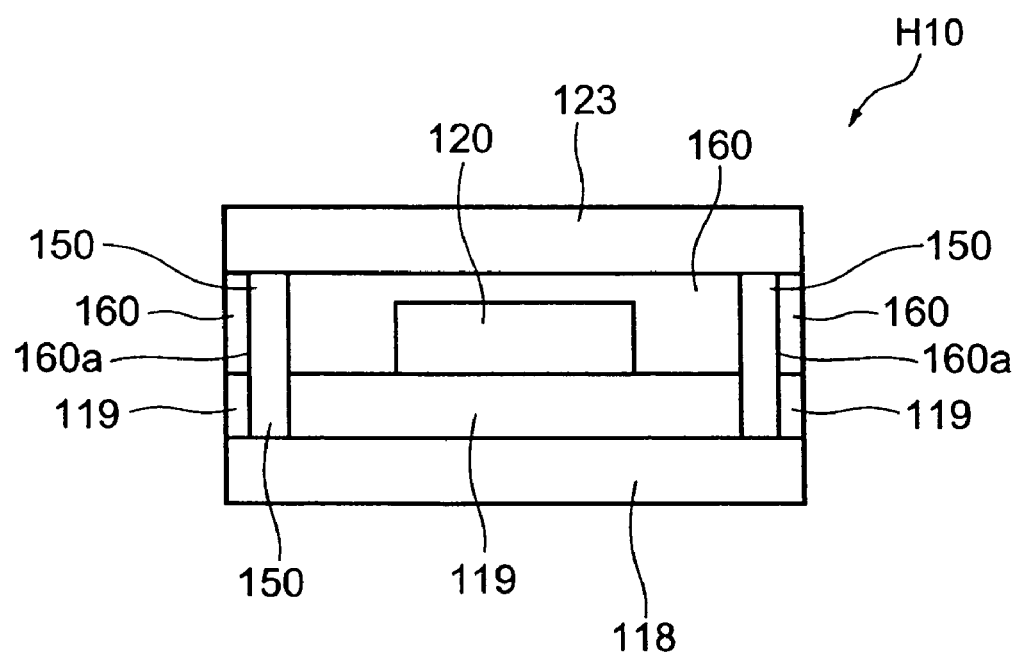
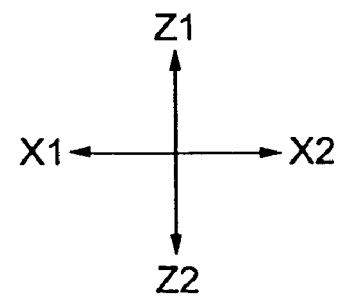

FIG. 18
PRIOR ART
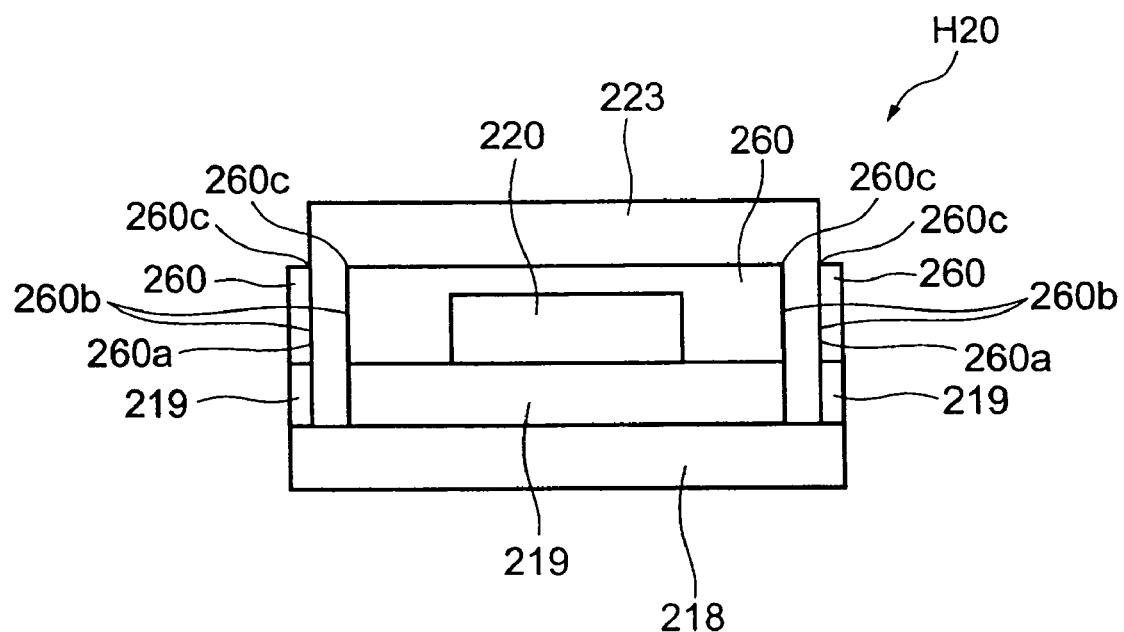
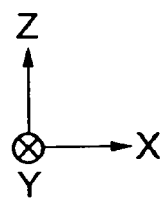

PERPENDICULAR MAGNETIC RECORDING HEAD AND METHOD OF MANUFACTURING THE SAME

BACKGROUND OF THE INVENTION

1. Field of the Invention

The present invention relates to a magnetic head, and more particularly, to a perpendicular magnetic recording head which is capable of effectively preventing a short circuit from occurring between coil layers of a recording head and obtaining an excellent coil peculiarity and a method of manufacturing the same.

2. Description of the Related Art

Each of FIG. 21 of JP-A-2002-170205 (Pub. No.: US 2002/0089783 A1) and FIG. 1 of JP-A-05-242429 discloses a configuration of a coil layer wound in a solenoid shape around a magnetic pole layer or a core layer which forms an inductive head (recording head).

In order to effectively use a three-dimensional space around the core layer, the coil layer is preferably wound in a helical shape. Therefore, it is possible to achieve a small-sized inductive head with superior magnetization efficiency.

In each of JP-A-2002-170205 and JP-A-05-242429, a front view where peripheral portions of a lower coil layer formed below a magnetic pole layer (core layer) and an upper coil layer formed above the magnetic pole layer are viewed from a recording medium facing surface side is not shown, but, it can be assumed from the described contents that a front view of a thin film magnetic head shown in FIG. 21 of JP-A-2002-170205 corresponds approximately to FIG. 17 and a front view of a thin film magnetic head shown in FIG. 1 of JP-A-05-242429 corresponds approximately to FIG. 18.

That is, in a thin film magnetic head H10 disclosed in FIG. 21 of JP-A-2002-170205, a lower coil layer 118 and an upper coil layer 123 are electrically connected to each other through a connecting layer 150, as shown in FIG. 17. In a thin film magnetic head H20 shown in FIG. 1 of JP-A-05-242429, a connecting portion 223c formed in an upper coil layer 223 is electrically connected to a lower coil layer 218, as shown in FIG. 18. In addition, the connecting layer 150 or the connecting portion 223c is formed in a direction which extends in a perpendicular direction with respect to a vertical direction of the thin film magnetic head (a direction of Z1-Z2 in the drawing).

According to a method of manufacturing the thin film magnetic head H10 shown in FIG. 21 of JP-A-2002-170205 and a method of manufacturing the thin film magnetic head H20 shown in FIG. 1 of JP-A-05-242429, by means of an etching technology, connection holes 160a and 260a (through holes) are formed in insulating layers 119 and 219 that cover lower coil layers 118 and 218 formed below magnetic pole layers 120 and 220 (core layers) and insulating layers 160 and 260 formed over a region ranging from the top surfaces of the magnetic pole layers 120 and 220 (core layers) to both sides of the magnetic pole layers 120 and 220 (core layers) in a track width direction, and top surfaces of the lower coil layers 118 and 218 are exposed.

In addition, in the thin film magnetic head shown in FIG. 21 of JP-A-2002-170205, after the connecting layer 150 shown in FIG. 17 is formed in the connection hole 160a, an upper coil layer 123 is formed such that the top surface of the connecting layer and the bottom surface of the upper coil layer 123 are electrically connected to each other. In this case, the lower coil layer 118 and the upper coil layer 123 are electrically connected to each other through the connecting layer 150 so as to form a coil layer wound in a toroidal shape around the magnetic layer 120.

In addition, in the perpendicular magnetic head H20 shown in FIG. 1 of JP-A-05-242429, the upper coil layer 223 is formed such that the connecting portion 223c of the upper coil layer 223 shown in FIG. 18 is formed in the through hole 260a. As a result, the lower coil layer 218 and the upper coil layer 223 are electrically connected to each other so as to form a coil layer wound in a helical shape around the core layer 220.

However, in the thin film magnetic head H10 disclosed in FIG. 21 of JP-A-2002-170205, the lower coil layer 218 and the upper coil layer 223 are connected to each other through the connecting layer 150. However, as shown in FIG. 17, when viewed from the facing surface of the recording medium, the lower coil layer 118 and the upper coil layer 123 extend linearly toward the track width direction (a direction of X1-X2 in the drawing). As a result, a length between the lower coil layer 118 and the upper coil layer 123 in the vertical direction (a direction of Z1-Z2 in the drawing) is large. Therefore, since the length of the connecting layer 150 for connecting the lower coil layer 118 to the upper coil layer 123 in the vertical direction is also increased, a resistance value of the entire coil layer may be increased.

In the meantime, in the thin film magnetic head H20 disclosed in FIG. 1 of JP-A-05-242429, since the connecting portion 223c of the upper coil layer 223 is formed so as to extend toward the lower coil layer 218, the lower coil layer 218 and the upper coil layer 223 can be electrically connected to each other without the connecting layer 150 interposed therebetween, as in the thin film magnetic head disclosed in FIG. 1 of JP-A-2002-170205 (the thin film magnetic head H10 shown in FIG. 17). Therefore, a resistance value of the entire coil layer can be decreased.

In the meantime, in the thin film magnetic head H20 disclosed in FIG. 1 of JP-A-05-242429, as shown in FIG. 18, the upper coil layer 223 is vertically bent at a part of the connecting portion 223c in a downward direction (a direction of Z2 in the drawing) toward the lower coil layer 218. For this reason, when the upper coil layer 223 is formed on the insulating layer 260 shown in FIG. 18, the abnormal shape may be easily formed and a short circuit may easily occur between the upper coil layers 223. As a result, it is not possible to obtain a superior coil peculiarity.

Specifically, when forming the upper coil layer 223 of the thin film magnetic head H20 shown in FIG. 1 of JP-A-05-242429, as shown in FIG. 18, a resist layer is coated on an insulating layer 260 and a through hole 260a where the side surfaces 260b are formed in a direction vertical to a film surface (a direction of Z1-Z2 in the drawing), as corner portions 260c of the insulating layer 260 are formed at a right angle, and a resist pattern is formed by exposing and developing the pattern of the upper coil layer 223 in the resist layer. And then, the upper coil layer 223 is formed by means of a known method, such as a plating method or the like, using the resist pattern. However, since the side surfaces 260b of the through hole 260a is formed in a direction vertical to the film surface, when the resist layer is exposed, a resist pattern falls into disarray in the vicinity of the side surfaces 260b of the through hole 260a due to the diffused reflection of the light occurring on the side surfaces 260b. For this reason, the abnormal shape may occur in the upper coil layer 223 formed on the basis of the resist pattern, and a short circuit or the like may occur in the upper coil layer 223.

SUMMARY OF THE INVENTION

The invention has been finalized in view of the drawbacks inherent in the conventional perpendicular magnetic recording head, and it is an object of the invention to provide a perpendicular magnetic recording head which is capable of effectively preventing a short circuit from occurring between coil layers and obtaining an excellent coil peculiarity and a method of manufacturing the same.

A perpendicular magnetic recording head according to an aspect of the invention includes: a first coil layer that has a plurality of first coil pieces which extend in a track width direction and are placed in a direction crossing the track width having at a predetermined intervals in between; a second coil layer that has a plurality of second coil pieces which extend in the track width direction and are placed in a direction crossing the track width having a predetermined intervals in between, the second coil layer being formed above the first coil layer; contact layers each of which electrically connects the first coil layer to the second coil layer; and a laminator that has a main magnetic pole layer and a gap layer which are formed between the first coil layer and the second coil layer and above a region between the contact layers. Further, first insulating layers are formed at both sides of the laminator, a second insulating layer is formed on a region ranging from a top surface of the laminator to top surfaces of the first insulating layers and below the second coil layer, and an inclined surface and a flat surface that is continuous to the inclined surface are formed in each of the first insulating layers, the inclined surface being inclined downward when progressing toward a lateral direction. Furthermore, in the second insulating layer, each of the inclined surfaces inclined downward when progressing toward the lateral direction is formed on the inclined surface of the first insulating layer, and a lateral region of the second coil layer extends downward along each of the inclined surfaces of the second insulating layers, and an inclined angle $\theta 1$ on the inclined surface of the first insulating layer with respect to the flat surface is larger than an inclined angle $\theta 2$ on the inclined surface of the second insulating layer with respect to the flat surface.

Preferably, an upper side of the flat surface of the first insulating layer and a top surface of the contact layer form a planarized surface.

Preferably, a bottom brim portion of the inclined surface of the second insulating layer is located in the planarized surface.

Preferably, the inclined angle $\theta 1$ of the inclined surface of the first insulating layer with respect to the flat surface is within a range of 55° to 70°.

A method of manufacturing a perpendicular magnetic recording head according to an another aspect of the invention includes: (a) a step for forming a plurality of first coil pieces extending in a track width direction in a direction crossing the track width having at a predetermined intervals in between so as to form a first coil layer; (b) a step for forming contact layers on both sides of the first coil layer so as to be electrically connected to the first coil layer; (c) a step of forming a laminator having a main magnetic pole layer and a gap layer on a region between the contact layers and forming first insulating layers on regions ranging from both sides of the laminator to top surfaces of the contact layers; (d) a step of grinding both sides of the first insulating layers to expose the top surfaces of the contact layers while forming an inclined surface and a flat surface in each of the first insulating layers, the inclined surface being inclined downward when progressing toward the lateral direction; (e) a step of forming a second insulating layer on the laminator and the first insulating layers so as to maintain a state in which the top surfaces of the contact layers are exposed while forming an inclined surface of the second insulating layer on the inclined surface of the first insulating layer, the inclined surface of the second insulating layer being inclined downward when progressing toward a lateral direction; and (f) a step of forming a plurality of second coil pieces extending in a track width direction in a region ranging from a top surface of the second insulating layer to the top surfaces of the contact layers in a direction crossing the track width having a predetermined intervals in between so as to form a second coil layer, in such a manner that the second coil layer and the first coil layer are electrically connected to each other through the top surfaces of the contact layers and a lateral region of the second coil layer extends downward along the inclined surface of the second insulating layer.

Preferably, at the step (e), an inclined angle $\theta 2$ of the inclined surface of the second insulating layer with respect to the flat surface is made to be smaller than an inclined angle $\theta 1$ of the inclined surface of the first insulating layer with respect to the flat surface.

Preferably, at the step (d), the flat surface formed in the first insulating layer and the top surface of the contact layer form a planarized surface.

Preferably, at the step (e), a bottom brim portion of the second insulating layer is formed so as to be located in the planarized surface.

Preferably, at the step (d), the inclined angle $\theta 1$ of the inclined surface formed in the first insulating layer is within a range of 55° to 70°.

In the perpendicular magnetic recording head according to the aspect of the invention, since the bottom brim portion of the inclined surface of the second insulating layer is formed so as to be located in the flat surface of the first insulating layer, the inclined angle $\theta 1$ of the inclined surface of the first insulating layer with respect to the flat surface can be made to be smaller than the inclined angle $\theta 2$ of the inclined surface of the second insulating layer with respect to the flat surface. Therefore, when performing a patterning process of a resist pattern for forming the second insulating layer, it is possible to suppress the diffused reflection of the light from occurring due to the exposure at the time of exposing and developing the resist layer at the inclined surface formed in the second insulating layer.

Therefore, the second coil layer can be formed with high precision while preventing an abnormal shape from forming in the resist pattern for forming the second coil layer. As a result, an abnormal shape can be prevented from forming in the second coil layer, so that it is possible to prevent a short circuit from occurring. Therefore, the second coil layer having superior coil peculiarity can be obtained.

In addition, in the perpendicular magnetic recording head, the inclined surface is formed on the first insulating layer which is located between the first coil layer and the second coil layer, and a lateral region of the second coil layer extends downward along the inclined surface of the second insulating layer which is formed on the inclined surface. For this reason, the second coil layer can be electrically connected to the first coil layer through only the contact layers. Accordingly, an electrical resistance is minimally suppressed between the first coil layer and the second coil layer, which results in obtaining a superior coil peculiarity.

In addition, since the second coil layer is formed such that the lateral region thereof extends downward along the inclined surface of the first insulating layer, the second coil layer can be made to be close to the first coil layer in a vertical direction. As a result, the thickness of the contact layer can be decreased. Therefore, a resistance value of the entire coil layer can be decreased.

Further, in the method of manufacturing the perpendicular magnetic recording head according to another aspect, the first inclined surface is formed on the first insulating layer which is located between the first coil layer and the second coil layer. In addition, a lateral region of the second coil layer extends downward along the inclined surface of the second insulating layer which is formed on the inclined surface. For this reason, the second coil layer can be electrically connected to the first coil layer through only the contact layers. Accordingly, an electrical resistance is minimally suppressed between the first coil layer and the second coil layer, which results in obtaining a superior coil peculiarity.

Furthermore, since the second coil layer is formed such that the lateral region thereof extends downward along the inclined surface of the first insulating layer, the second coil layer can be made to be close to the first coil layer in a vertical direction. As a result, the thickness of the contact layer can be decreased. Therefore, a resistance value of the entire coil layer can be decreased.

BRIEF DESCRIPTION OF THE DRAWINGS

FIG. 17 is a partial front view illustrating a conventional magnetic recording head as viewed from a recording medium facing surface; and FIG. 18 is a partial front view illustrating a conventional magnetic recording head as viewed from a recording medium facing surface.

DESCRIPTION OF THE PREFERRED EMBODIMENTS

Figure 1:
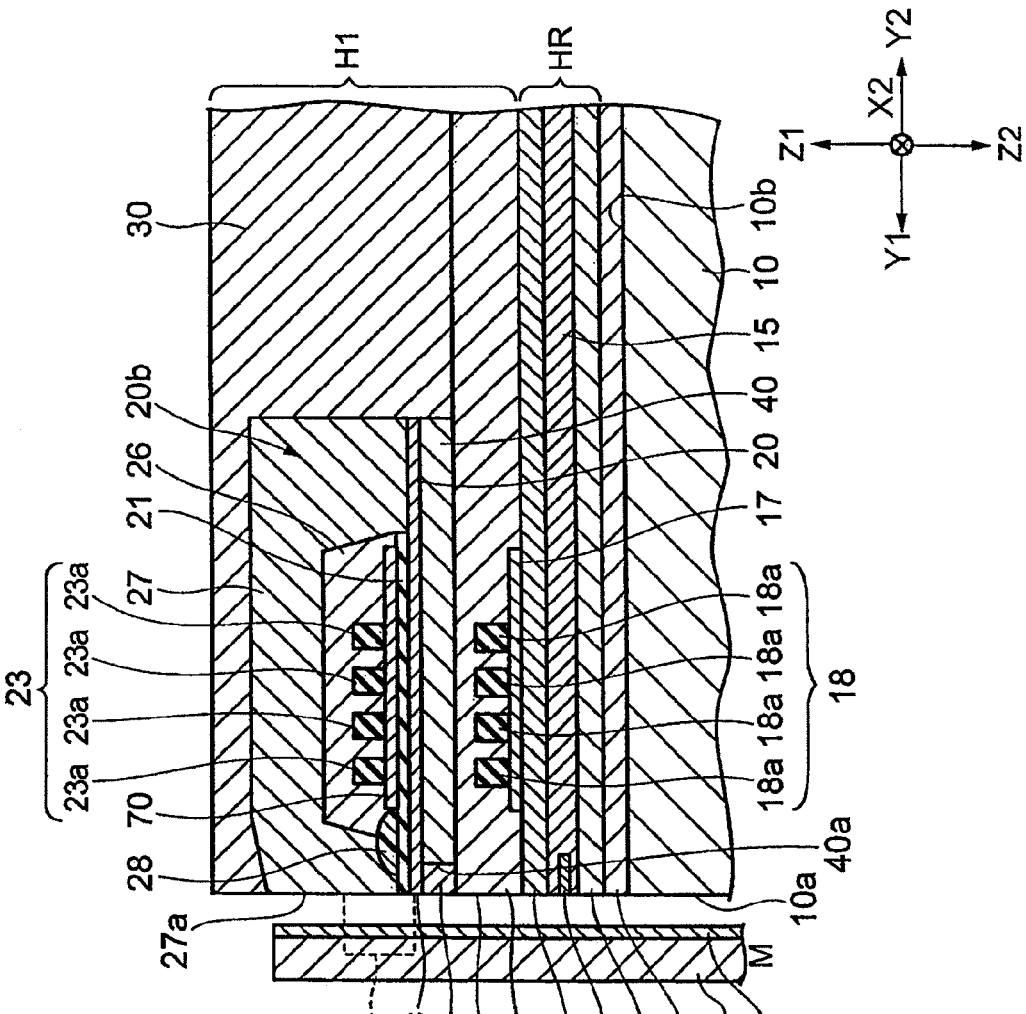
FIG. 1 is a partial longitudinal cross-sectional view illustrating a perpendicular magnetic recording head according to an embodiment of the invention.
Figure 2:
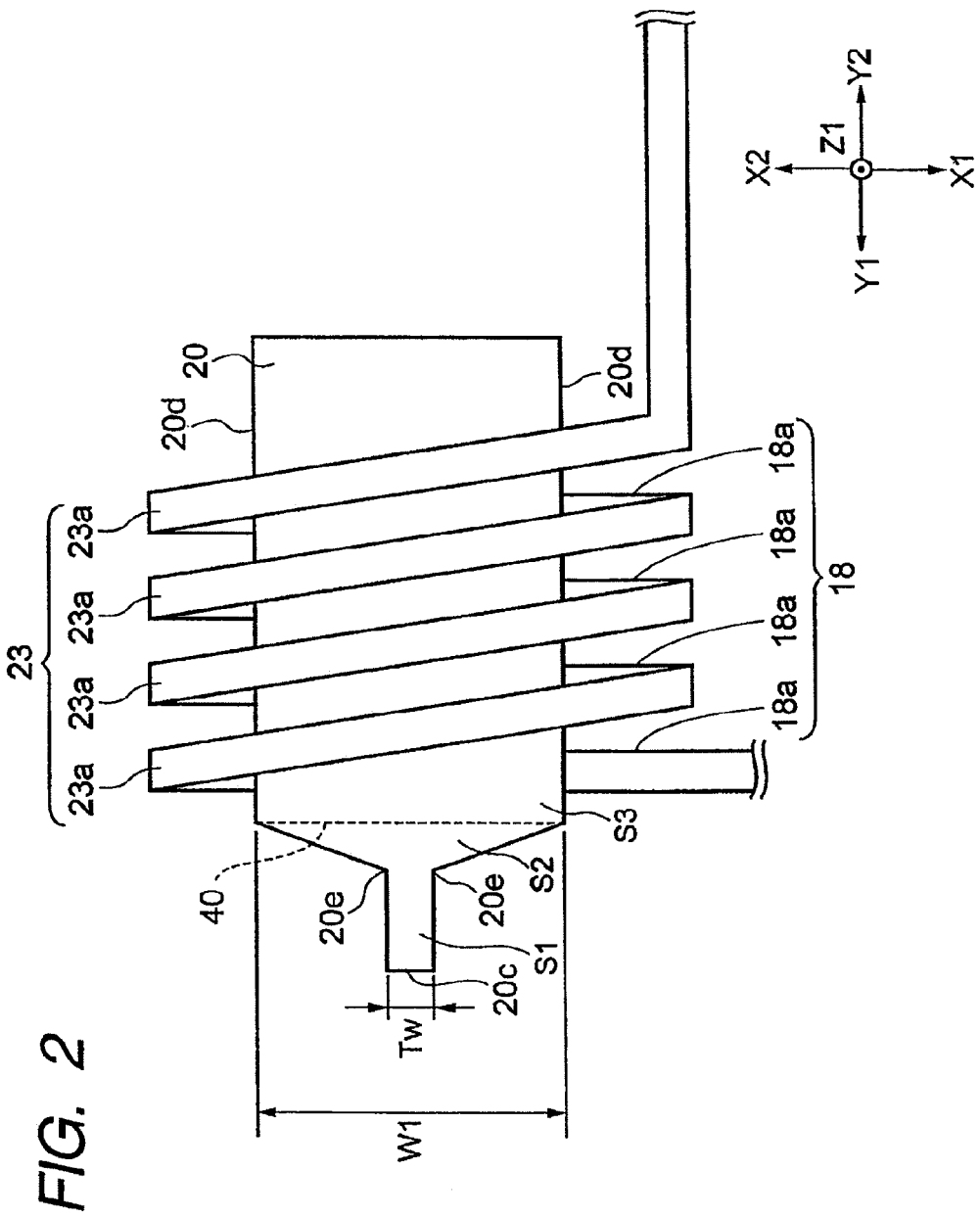
FIG. 2 is a partial plan view illustrating a perpendicular magnetic recording head illustrated in FIG. 1.
Figure 3:
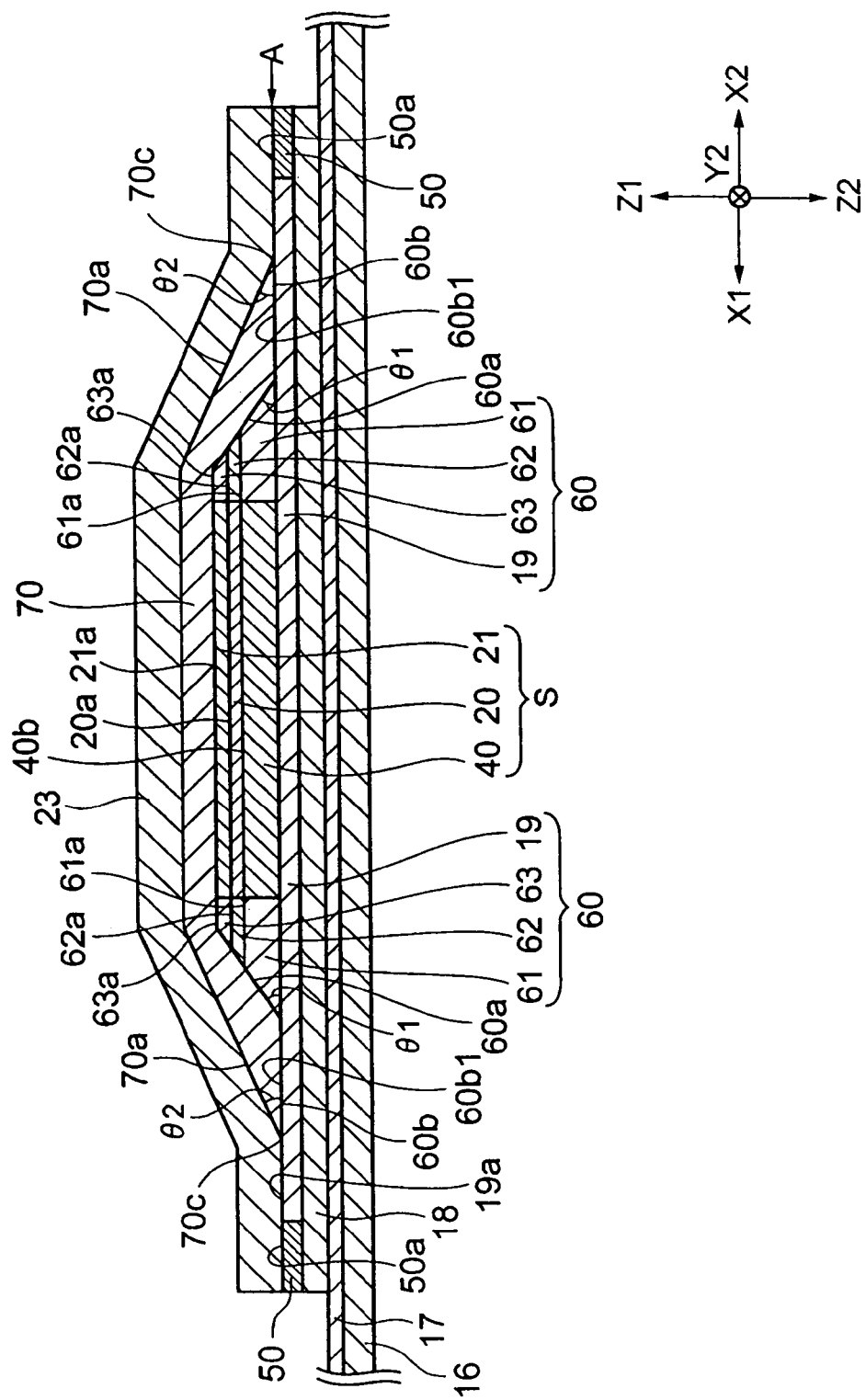
FIG. 3 is a partial front view illustrating a perpendicular magnetic recording head illustrated in FIG. 1 as viewed from a recording medium facing surface F.

FIG. 1 is a partial longitudinal cross-sectional view illustrating a perpendicular magnetic recording head according to an embodiment of the invention, FIG. 2 is a partial plan view illustrating a perpendicular magnetic recording head illustrated in FIG. 1; and FIG. 3 is a partial front view illustrating a perpendicular magnetic recording head illustrated in FIG. 1 as viewed from a recording medium facing surface F.

Hereinafter, a direction of X1-X2 in the respective drawings is referred to as a track width direction, and a direction of Y2 in the respective drawings is referred to as a heightwise direction. Further, a recording medium facing surface F is formed in a direction parallel to a plane which is formed in the track width direction (a direction of X1-X2 in the drawing) and a film thickness direction (a direction of Z1-Z2 in the drawing).

In a perpendicular magnetic recording head H1 shown in FIG. 1, a perpendicular magnetic field is applied to a recording medium M for magnetizing a hard film Ma of the recording medium M in a perpendicular direction.

The recording medium M has, for example, a disk shape. The recording medium M has the hard film Ma on its outer surface, which has high residual magnetization, and a soft film Mb on the inner side, which has a high magnetic permeability. The recording medium M rotates about the disk center which serves as the center of the rotation.

The slider 10 is formed of a non-magnetic material, such as $Al_2O_3$.Ti or the like. The slider 10 has a facing surface 10a positioned opposite to the recording medium M. If the recording medium M rotates, the slider 10 floats from the surface of the recording medium M due to an air stream produced on the surface of the recording medium M, or slides on the surface of the recording medium M.

On a trailing-side end surface 10b (top surface) of the slider 10, a non-magnetic insulating layer 12 is formed which is formed of an inorganic material, such as $Al_2O_3$, $SiO_2$ or the like. Further, a reading portion $H_R$ is formed on the non-magnetic insulating layer 12.

The reading portion HR includes a lower shielding layer 13, an upper shielding layer 16, and a reading element 14 which is located within an inorganic insulating layer 15 (gap insulating layer) between the lower shielding layer 13 and the upper shielding layer 16. The reading element 14 is a magnetoresistance effect element, such as AMR, GMR, TMR, or the like.

On the upper shielding layer 16, a plurality of first coil pieces 18a are formed with a first coil insulating base layer 17 interposed therebetween. In this case, each of the plurality of first coil pieces 18a is formed of a conductive material and the first coil insulating base layer 17 is formed of a non-magnetic material, such as alumina ($Al_2O_3$). Each of the first coil pieces 18a is formed of at least one non-magnetic metallic material selected from the group consisting of Au, Ag, Pt, Cu, Cr, Al, Ti, NiP, Mo, Pd and Rh. Alternatively, each of the first coil pieces 18a may have a laminated structure in which the above-described non-magnetic materials are laminated. The plurality of first coil pieces 18a form a first coil layer 18.

Around the first coil layer 18, a first coil insulating layer 19 is formed which is formed of an inorganic insulating material, such as $Al_2O_3$ or the like, or an organic insulating material, such as a resist or the like.

A top surface 19a of the first coil insulating layer 19 is planarized. In addition, a plating base layer (not shown) is formed on the top surface 19a, and an auxiliary yoke layer 40 is formed on the plating base layer. This auxiliary yoke layer 40 is formed of an alloy of NiFe or the like, and a front end surface 40a of the auxiliary yoke layer 40 is located closer in a heightwise direction (a direction of Y2 in the drawing) than the facing surface F of the recording medium without appearing on the facing surface F of the recording medium. Further, a first insulator 61 is formed around the auxiliary yoke layer 40. This first insulator 61 is formed continuously over a region ranging from the front end surface 40a of the auxiliary yoke layer 40 to the facing surface F of the recording medium.

On the auxiliary yoke layer 40, a main magnetic pole layer 20 is formed. The main magnetic pole layer 20 is formed with a predetermined length from the facing surface F of the recording medium toward a heightwise direction (a direction of Y2 in the drawing), and has a front end surface 20c in which a size of the front end surface 20c in the track width direction (a direction of X1-X2 in the drawing) is equivalent to a track width Tw.

The main magnetic pole layer 20 is formed of a ferromagnetic material by using, for example, a plating method. That is, the main magnetic pole layer 20 is formed of a material, such as Ni—Fe, Co—Fe, Ni—Fe—Co, or the like, which has a high saturation magnetic flux density.

As shown in FIG. 2, the main magnetic pole layer 20 has a front portion S1, an inclined portion S2, and a rear portion S3. Each of the inclined portion S2 and the rear portion S3 is formed such that its width dimension W1 from the base end portion 20e of the front portion S1 toward a heightwise direction (a direction of Y2 in the drawing) or toward the track width direction (a direction of X1-X2 in the drawing) is larger than the track width Tw.

As shown in FIG. 2, side end portions 20d and 20d of the rear portion S3 of the main magnetic pole layer 20 in the track width direction (a direction of X1-X2 in the drawing) extend in a direction parallel to the heightwise direction (a direction of Y2 in the drawing). Further, of the main magnetic pole layer 20 shown in FIG. 2, the front portion S1 may be referred to as a main magnetic pole layer and the inclined portion S2 and the rear portion S3 may be referred to as a yoke layer.

Further, a gap layer 21, which is formed of an inorganic material, such as alumina, $SiO_2$, or the like, is formed on the main magnetic pole layer 20. The gap layer 21 may be formed of a non-magnetic metallic material, such as Au, Pt, Ru, or the like. Alternatively, the gap layer 21 may have a laminated structure which includes an inorganic material and/or a non-magnetic metallic material.

The auxiliary yoke layer 40, the main magnetic pole layer 20, and the gap layer 21 form a laminator S according to this embodiment.

As shown in FIG. 1, on the gap layer 21, a plurality of second coil pieces 23a are formed with a second insulating layer 70 interposed therebetween. In this case, the second insulating layer 70 serves as a coil insulating base layer. Similar to the first coil pieces 18a, each of the plurality of second coil pieces 23a is formed of a conductive material. Specifically, each of the second coil pieces 23a is formed of at least one non-magnetic metallic material selected from the group consisting of Au, Ag, Pt, Cu, Cr, Al, Ti, NiP, Mo, Pd and Rh. Alternatively, each of the second coil pieces 23a may have a laminated structure in which the above-described non-magnetic metallic materials are laminated. The plurality of second coil pieces 23a form a second coil layer 23.

FIG. 2 is a partial plan view illustrating the first coil layer 18, the second coil layer 23, the auxiliary yoke layer 40, and the main magnetic pole layer 20 in the perpendicular magnetic recording head H1 shown in FIG. 1 as viewed from an upward direction (a direction of Z1 in FIG. 1). As shown in FIG. 2, end portions of the first coil layer 18 and the second coil layer 23 in the track width direction (a direction of X1-X2 in the drawing) are electrically connected to each other through a contact layer 50 (which will be described in detail below) in order to form a solenoid shape.

Around the second coil layer 23, a coil insulating layer 26 is formed which is formed of an inorganic insulating material, such as $Al_2O_3$ or the like, or an organic insulating material, such as a resist or the like. Further, by using a ferromagnetic material, such as Permalloy, a return path layer 27 is formed continuously over a region ranging from a top surface of the coil insulating layer 26 to a top surface of the gap layer 21. The rear end portion of the return path layer 27 in the heightwise direction (a direction of Y2 in the drawing) corresponds to a connecting portion 20b which is electrically connected to the main magnetic pole layer 20. On the gap layer 21, a Gd determining layer 28 formed of an inorganic material or an organic material is formed at a position spaced apart from the facing surface F of the recording medium by a predetermined distance. Further, a length of a gap depth of the perpendicular magnetic recording head H1 is defined by the distance from the facing surface F of the recording medium to the front edge of the Gd determining layer 28.

As shown in FIG. 1, the return path layer 27 is covered with a protective layer 30, which is formed of an inorganic non-magnetic insulating material or the like.

The thickness of the front end surface 20c of the main magnetic pole layer 20 is made to be smaller than that of the front end surface 27a of the return path layer 27, and the width (track width) of the front end surface 20c of the main magnetic pole layer 20 in the track width direction (direction of X1-X2 in the drawing) is much smaller than the width of the front end surface 27a of the return path layer 27 in the track width direction. As a result, on the facing surface F of the recording medium, an area of the front end surface 20c of the main magnetic pole layer 20 is sufficiently smaller than that of the front end surface 27a of the return path layer 27. Therefore, the magnetic flux φ of the leakage recording magnetic field is concentrated to the front end surface 20c of the main magnetic pole layer 20. And then, the hard film Ma is magnetized in a perpendicular direction by means of the concentrated magnetic flux φ, so that magnetic data is recorded.

Hereinafter, the embodiment of the invention will be described in more detail.

FIG. 3 is a partial front view illustrating the perpendicular magnetic recording head H1 shown in FIG. 1 as viewed from the facing surface F of the recording medium.

As shown in FIG. 3, in the perpendicular magnetic recording head H1, contact layers 50 are formed at both sides of the first coil insulating layer 19. Each of the contact layers 50 is formed of a conductive material. Also, the contact layer 50 may be formed of a conductive magnetic material, but is preferably formed of the same material as the first coil layer or the second coil layer. Specifically, the contact layer 50 is formed of at least one non-magnetic metallic material selected from the group consisting of Au, Ag, Pt, Cu, Cr, Al, Ti, NiP, Mo, Pd, Rh, and Ni. Alternatively, the contact layer 50 may have a laminated structure in which the above-described non-magnetic metallic materials are laminated.

In the embodiment illustrated in FIG. 3, top surfaces 50a of the contact layers 50 are on the same plane as the top surface 19a of the first coil insulating layer 19, so that a planarized surface A is formed. In addition, the first coil layer 18 and the second coil layer 23 are electrically connected to each other through the contact layers 50 at the side portions thereof.

Around the auxiliary yoke layer 40, formed are first insulators 61 each of which is formed of an inorganic insulating material, such as $Al_2O_3$ or the like, and an organic insulating material, such as a resist or the like. The top surfaces 61a of the first insulators 61 are on the same plane as the top surface 40b of the auxiliary yoke layer 40 so as to form a planarized surface.

Around the main magnetic pole layer 20 formed on the auxiliary yoke layer 40, formed are second insulators 62 each of which is formed of an inorganic insulating material, such as $Al_2O_3$ or the like, and an organic insulating material, such as a resist or the like. The top surfaces 62a of the second insulators 62 are on the same plane as the top surface 20a of the main magnetic pole layer 20 so as to form a planarized surface.

Around the gap layer 21 formed on the main magnetic pole layer 20, formed are third insulators 63 each of which is formed of an inorganic insulating material, such as $Al_2O_3$ or the like, and an organic insulating material, such as a resist or the like. The top surfaces 63a of the third insulators 63 are on the same plane as the top surface 21a of the gap layer 21 so as to form a planarized surface.

As shown in FIG. 3, the first coil insulating layer 19, the first insulator 61, the second insulator 62, and the third insulator 63 form a first insulating layer 60.

As shown in FIG. 3, in the first insulating layer 60, the side surface of the first insulator 61, the side surface of the second insulator 62, and the side surface of the third insulator 63 form an inclined surface 60a which is inclined downward (in a direction of Z2 in the drawing) when progressing toward the lateral direction (a direction of X1 or X2 in the drawing). In addition, in the first insulating layer 60, a flat surface 60b is formed so as to be continuous to the inclined surface 60a. As shown in FIG. 3, the flat surface 60b is composed of the top surface 19a of the first coil insulating layer 19. Therefore, the flat surface 60b of the first insulating layer 60 and the top surface 50a of the contact layer 50 form the planarized surface A.

As shown in FIG. 3, a second insulating layer 70 is formed continuously over a region ranging from the top surfaces of the laminator S and the first insulating layers 60 to the inclined surfaces 60a and the flat surfaces 60b of the first insulating layers 60. In this case, the second insulating layer 70 is formed of an organic insulating material, such as a resist or the like.

In the second insulating layer 70, inclined surfaces 70a, which are inclined downward when progressing toward the lateral direction, are formed. Each of the inclined surfaces 70a is formed on the inclined surface 60a. As shown in FIG. 3, a bottom rim portion 70c of the inclined surface 70a of the second insulating layer 70 is formed to be located in the flat surface 60b of the first insulating layer 60.

As shown in FIG. 3, the inclined surface 60a of the first insulating layer 60 is formed at an inclined angle of θ1 with respect to a top surface 60b1 of the flat surface 60b of the first insulating layer 60. Further, as shown in FIG. 3, the inclined surface 70a of the second insulating layer 70 is formed at an inclined angle of θ2 with respect to the top surface 60b1 of the flat surface 60b of the first insulating layer 60.

As shown in FIG. 3, the inclined angle θ2 of the second insulating layer 70 is made to be smaller than the inclined angle θ1 of the first insulating layer 60.

In addition, as shown in FIG. 3, the second coil layer 23 is formed continuously over a region ranging from the top surface of the second insulating layer 70 to the inclined surfaces 70a and the top surfaces 50a of the contact layers 50, and the first coil layer 18 and the second coil layer 23 are electrically connected to each other through the contact layers 50.

In the perpendicular magnetic recording head H1 according to this embodiment, the bottom brim portion 70c of the inclined surface 70a of the second insulating layer 70 is formed to be located in the flat surface 60b of the first insulating layer 60. In addition, the inclined angle θ2 of the inclined surface 70a of the second insulating layer 70, which is formed below the second coil layer 23, is made to be smaller than the inclined angle θ1 of each of the first insulating layers 60, which are formed at both sides of the laminator S.

In the perpendicular magnetic recording head H1, as will be described in detail in the following method of the perpendicular magnetic recording head, when the second coil layer 23 is formed on the second insulating layer 70, a resist layer R3 is coated on a region ranging from the top surface 70d of the second insulating layer 70 to the inclined surfaces 70a, a pattern of the second coil layer 23 is exposed and developed in the resist layer R3 so as to form a resist pattern R3p, and the second coil layer 23 is formed by means of a known method, such as a plating method or the like, using the resist pattern R3p. At this time, in the perpendicular magnetic recording head H1 according to this embodiment, the bottom brim portion 70c of the inclined surface 70a of the second insulating layer 70 is formed to be located in the flat surface 60b of the first insulating layer 60, so that the inclined surface 70a of the second insulating layer 70 can be formed at an inclined angle θ2 which is made to be smaller than the inclined angle θ1 of the inclined surface 60a of the first insulating layer 60.

For this reason, when a patterning process of the resist pattern R3p is performed, it is possible to suppress the diffused reflection of the light from occurring due to the exposure at the time of exposing and developing the resist layer at the inclined surface 70a.

Accordingly, the second coil layer 23 can be formed with high precision while preventing abnormal shapes from occurring in the resist pattern R3p for forming the second coil layer 23. As a result, abnormal shapes can be prevented from occurring in the second coil pieces 23a which form the second coil layer 23, so that it is possible to suitably prevent a short circuit from occurring in the second coil layer 23. For this reason, in the perpendicular magnetic recording head H1, it is possible to form the second coil layer 23 having a superior coil peculiarity.

In addition, in the perpendicular magnetic recording head H1, the inclined surfaces 60a are formed in the first insulating layer 60 which is located between the first coil layer 18 and the second coil layer 23, and a lateral region of the second coil layer 23 extends downward (a direction of Z2 shown in FIG. 3) along the inclined surface 70a of the second insulating layer 70 which is formed on each of the inclined surfaces 60a. For this reason, the second coil layer 23 can be electrically connected to the first coil layer 18 through only the contact layers 50.

Accordingly, when being compared with a structure in which the same layers as the auxiliary yoke layer 40, the main magnetic pole layer 20, and the gap layer 21 for constructing the laminator S are formed between the first coil layer 18 and the second coil layer 23, and the first coil layer 18 and the second coil layer 23 are connected to each other through the same layers, an electrical resistance is minimally suppressed between the first coil layer 18 and the second coil layer 23. Therefore, in the perpendicular magnetic recording head H1, a superior coil peculiarity can be obtained.

In addition, the second coil layer 23 is formed such that the lateral region thereof extends downward along the inclined surface 70a, so that the second coil layer 23 can be made to be close to the first coil layer 18 in a vertical direction (a direction of Z1-Z2 in FIG. 3). As a result, it is possible to decrease the thickness of the contact layer 50. Therefore, a resistance value of the entire coil layer can be decreased.

In addition, since the flat surface 60b of the first insulating layer 60 and the top surface 50a of the contact layer 50 form the planarized surface A, the lateral region of the second coil layer 23 can be formed on the planarized surface A, so that the second coil layer 23 can be surely connected to the contact layer 50.

Hereinafter, a method of manufacturing the perpendicular magnetic recording head H1 illustrated in FIGS. 1 to 3 will be described with reference to FIGS. 4 to 16. FIGS. 4 to 16 are diagrams illustrating the manufacturing processes of the perpendicular magnetic recording head H1 when viewed from the facing surface F of the recording medium shown in FIG. 1 and shown from the same direction as FIG. 3. In addition, in the method of manufacturing the perpendicular magnetic recording type head illustrated in FIGS. 4 to 11, the constituent members formed below the upper shielding layer 16 (a direction of Z2 shown in FIG. 1) will be not described. In addition, the constituent members formed below the upper shielding layer 16 can be formed by using a known method.

Figure 4:
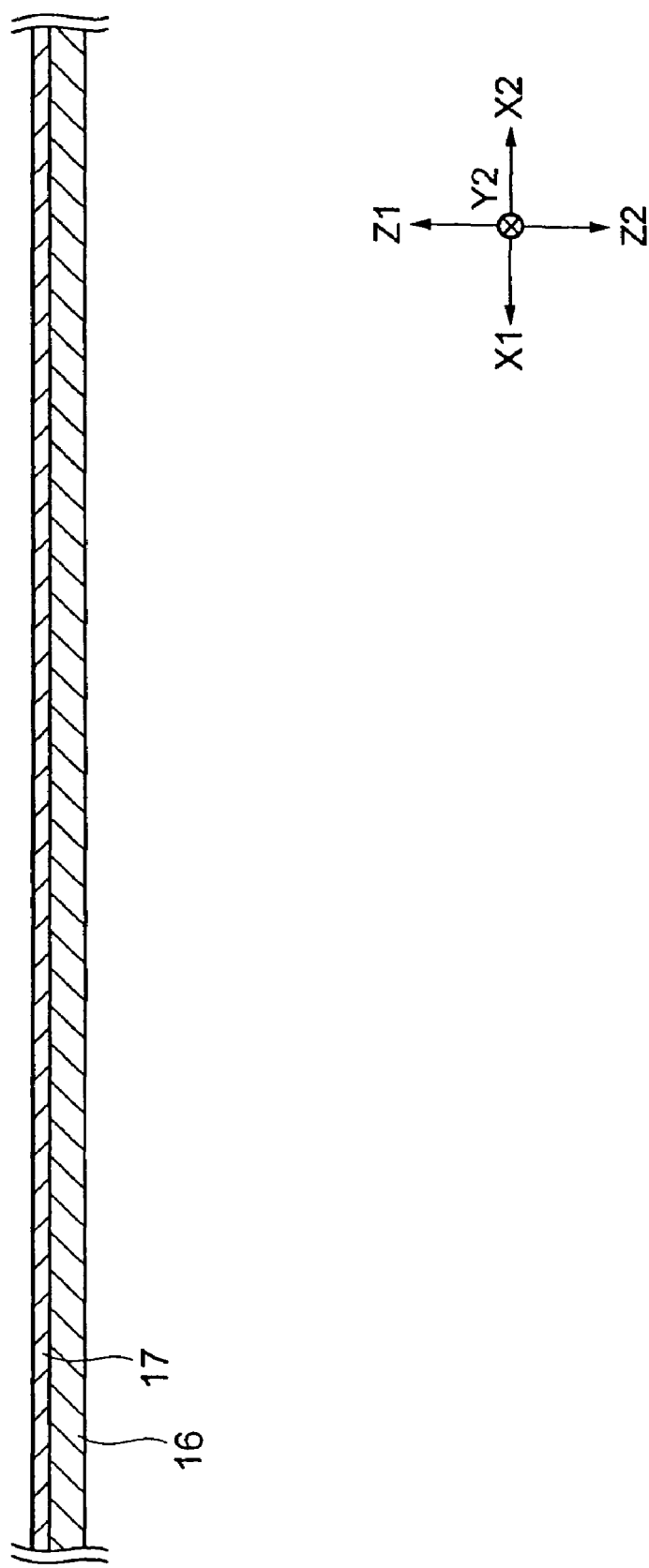
FIG. 4 is a diagram illustrating one process of a method of manufacturing a perpendicular magnetic recording head illustrated in FIG. 1.

First, as shown in FIG. 4, the first coil insulating base layer 17 is laminated on the upper shielding layer 16.

Figure 5:
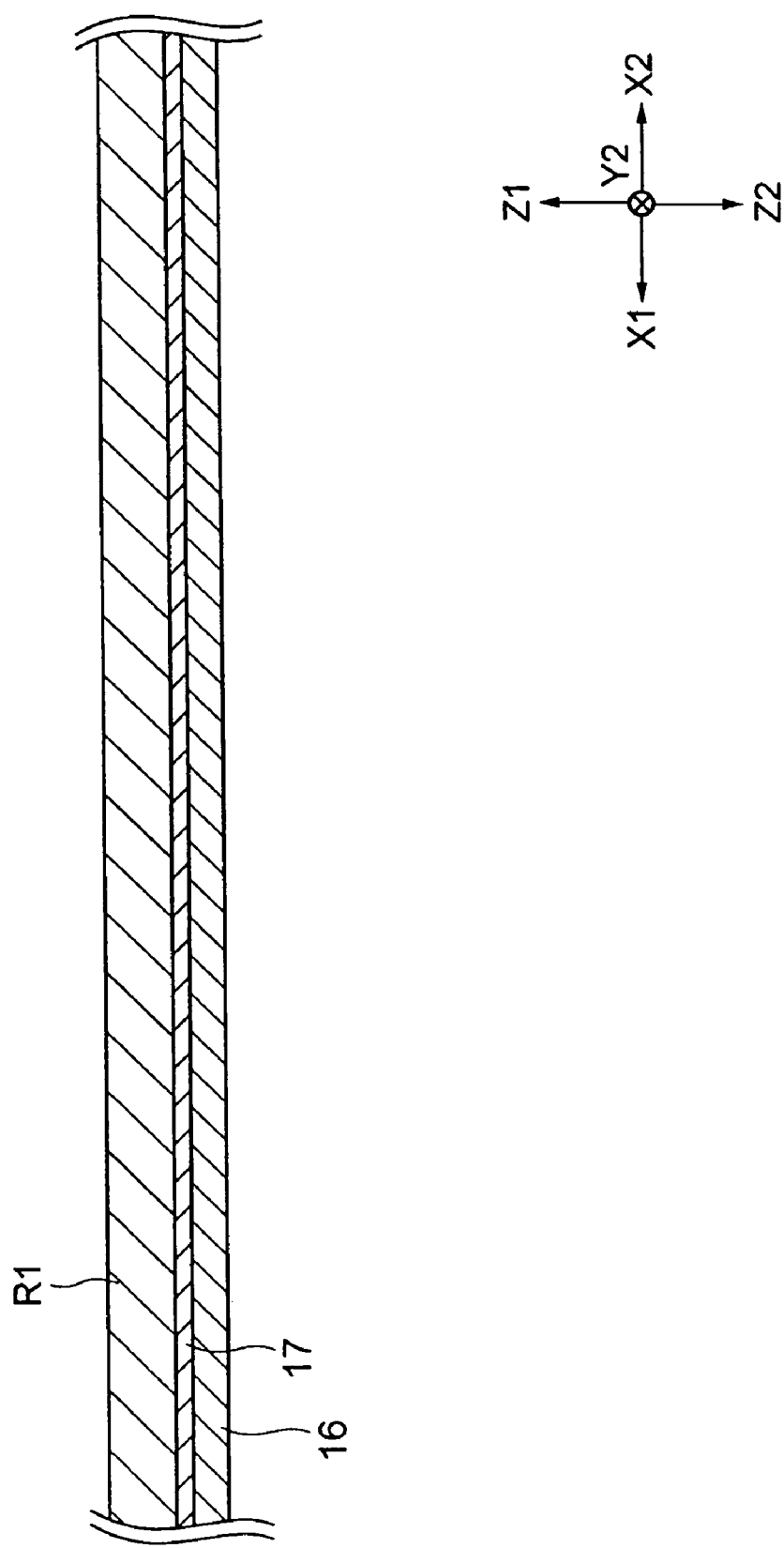
FIG. 5 is a diagram illustrating a process performed after the process illustrated in FIG. 4.
Figure 6:
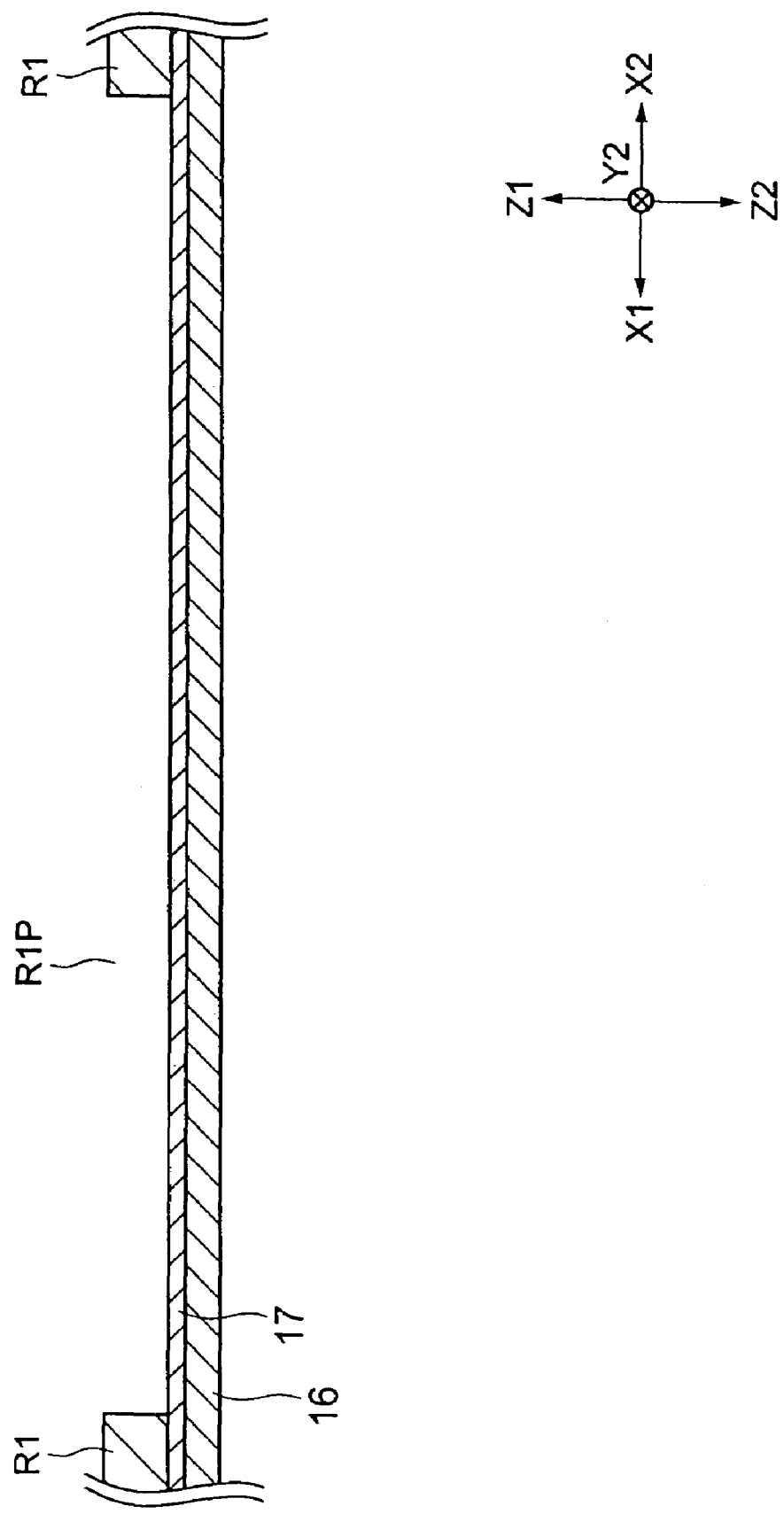
FIG. 6 is a diagram illustrating a process performed after the process illustrated in FIG. 5.

Next, as shown in FIG. 5, a plating base layer (not shown) is formed on the first coil insulating base layer 17, and a resist layer R1 is formed on the plating base layer which is provided on the first coil insulating base layer 17. And then, as shown in FIG. 6, the resist layer R1 is exposed and developed so as to form a resist pattern R1p for forming the first coil layer 18.

Figure 7:
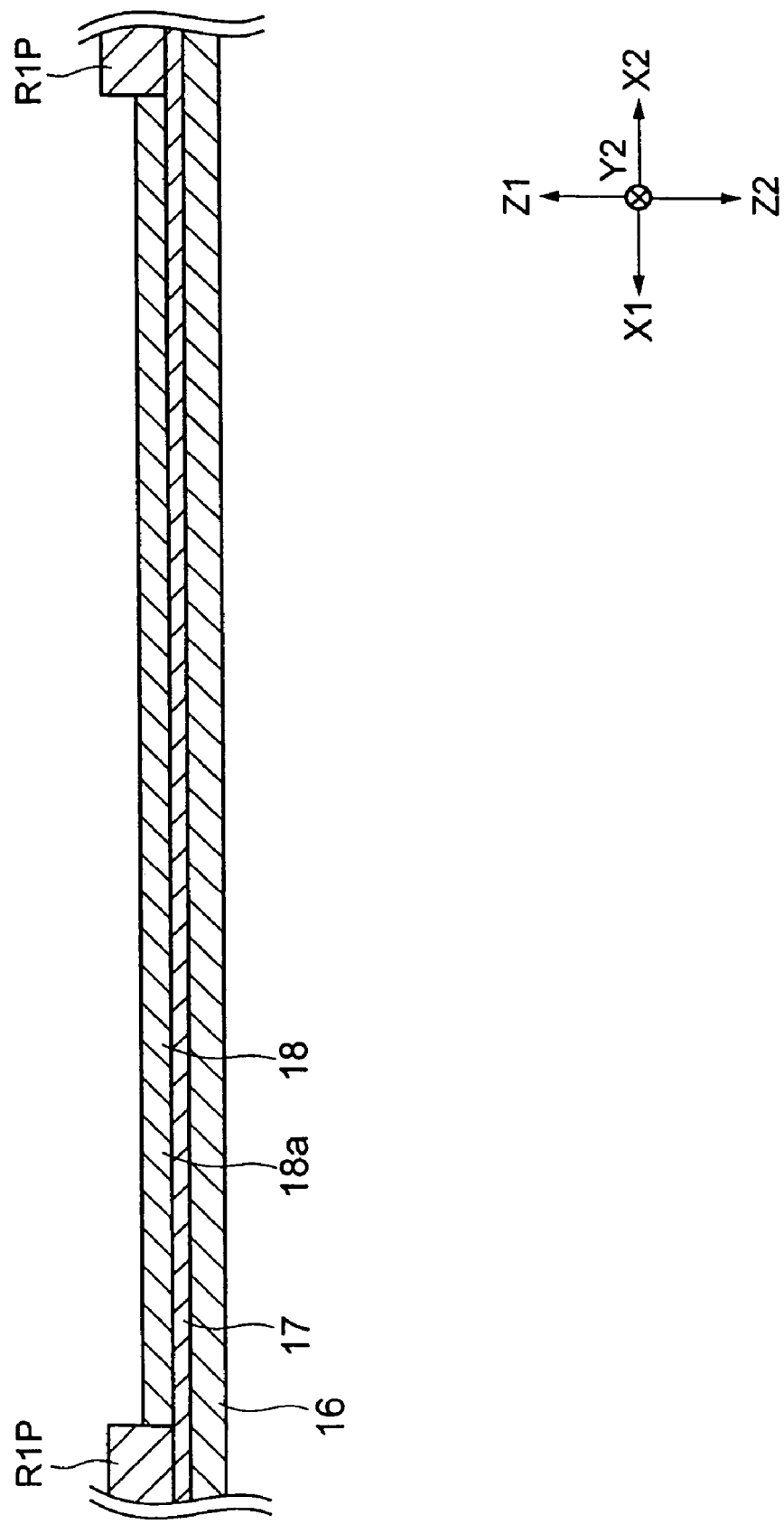
FIG. 7 is a diagram illustrating a process performed after the process illustrated in FIG. 6.

Next, as shown in FIG. 7, the plurality of first coil pieces 18a, which are disposed at predetermined intervals in the heightwise direction (a direction of Y2 in the drawing) (see FIG. 1), are formed on the plating base layer located between the resist patterns R1p. The plurality of first coil pieces 18a can be formed on the plating base layer by means of a plating method or the like.

Figure 8:
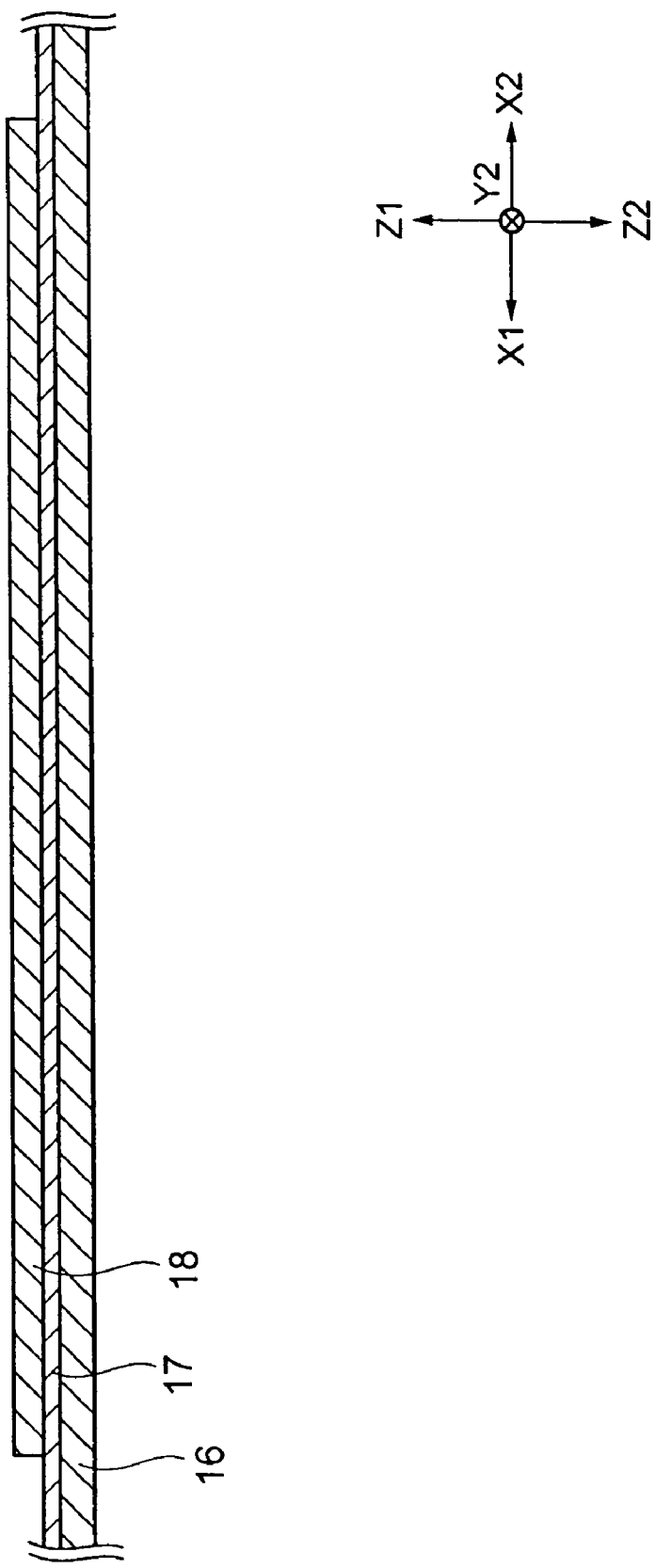
FIG. 8 is a diagram illustrating a process performed after the process illustrated in FIG. 7.

Next, if the resist patterns R1p are removed as shown in FIG. 8, the first coil layer 18 is formed which is composed of the plurality of first coil pieces 18a.

Figure 9:
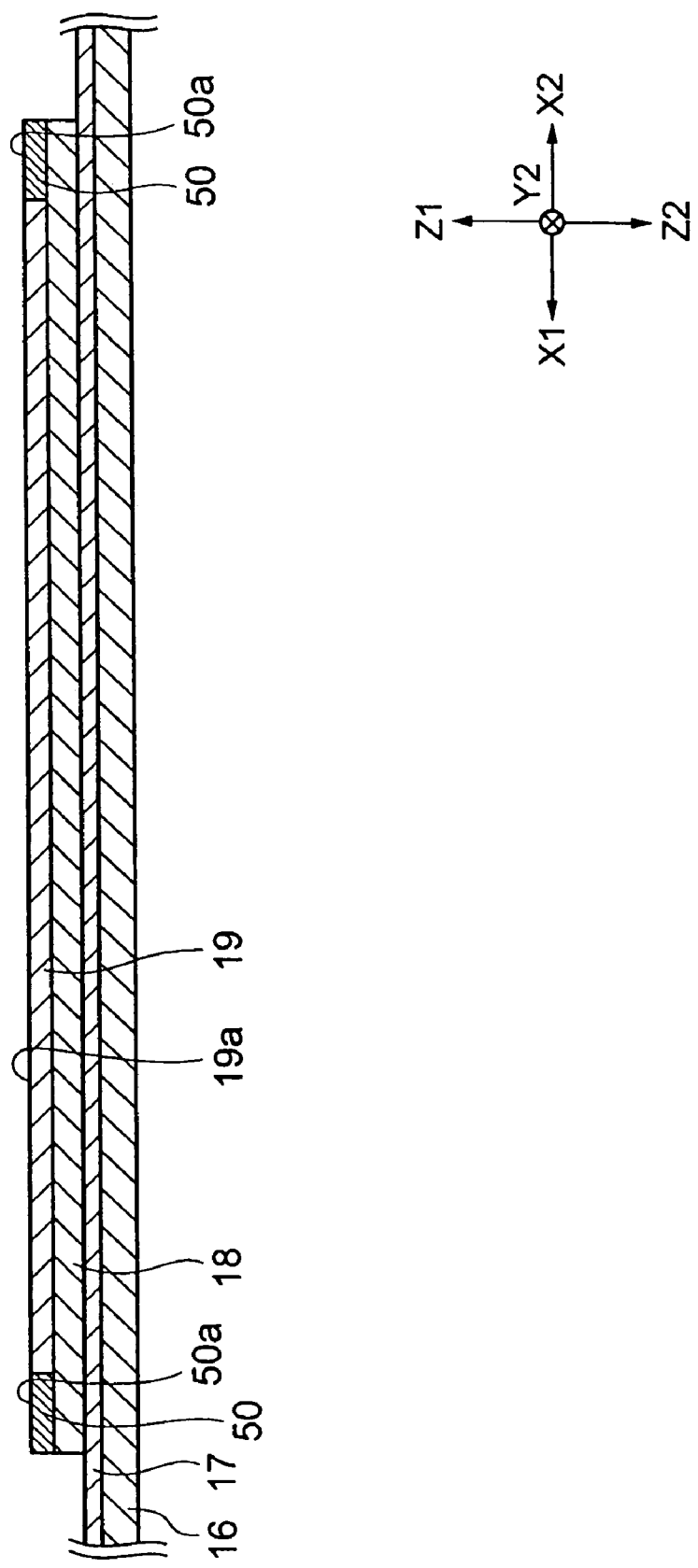
FIG. 9 is a diagram illustrating a process performed after the process illustrated in FIG. 8.

Next, as shown in FIG. 9, the contact layers 50 are formed on both sides of the first coil layer 18, and the first coil insulating layer 19 is formed on the first coil layer 18 between the contact layers 50. In addition, as shown in FIG. 9, in order that the top surface 50a of the contact layer 50 and the top surface 19a of the first coil insulating layer 19 are on the same plane, a grinding process is performed by using a known method, such as, for example, CMP or the like.

Figure 10:
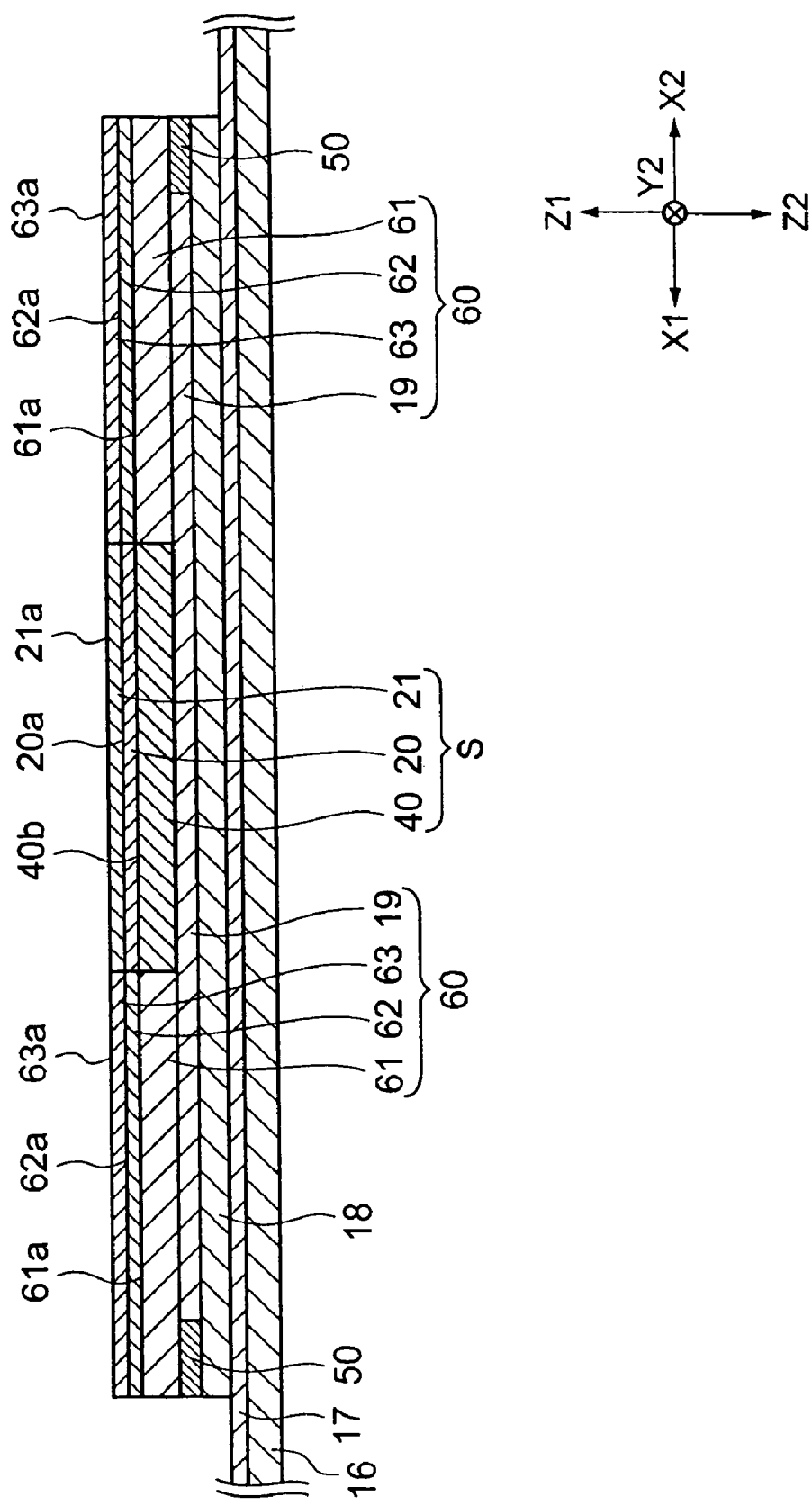
FIG. 10 is a diagram illustrating a process performed after the process illustrated in FIG. 9.

Next, as shown in FIG. 10, the auxiliary yoke layer 40 is formed on the first coil insulating layer 19, and the first insulators 61 are formed over a region ranging from the first coil insulating layer 19 to the contact layers 50 at both sides of the auxiliary yoke layer 40. In addition, in order that the top surface 40b of the auxiliary yoke layer 40 and the top surfaces 61a of the first insulators 61 are on the same plane, a grinding process is performed by using a known method, such as, for example, CMP or the like.

Next, as shown in FIG. 10, the main magnetic pole layer 20 is formed on the auxiliary yoke layer 40, and the second insulators 62 are formed on the first insulators 61 at both sides of the main magnetic pole layer 20. In addition, in order that the top surface 20a of the main magnetic pole layer 20 and the top surfaces 62a of the second insulators 62 are on the same plane, a grinding process is performed by using a known method, such as, for example, CMP or the like.

Next, as shown in FIG. 10, the gap layer 21 is formed on the main magnetic pole layer 20, and the third insulators 63 are formed on the second insulators 62 at both sides of the gap layer 21. In addition, in order that the top surface 21a of the gap layer 21 and the top surfaces 63a of the third insulators 63 are on the same plane, a grinding process is performed by using a known method, such as, for example, CMP or the like. This state is illustrated in FIG. 10. As shown in FIG. 10, the auxiliary yoke layer 40, the main magnetic pole layer 20, and the gap layer 21 form the laminator S. In addition, the first coil layer insulating layer 19, the first insulator 61, the second insulator 62, and the third insulator 63 form the first insulating layer 60.

Figure 11:
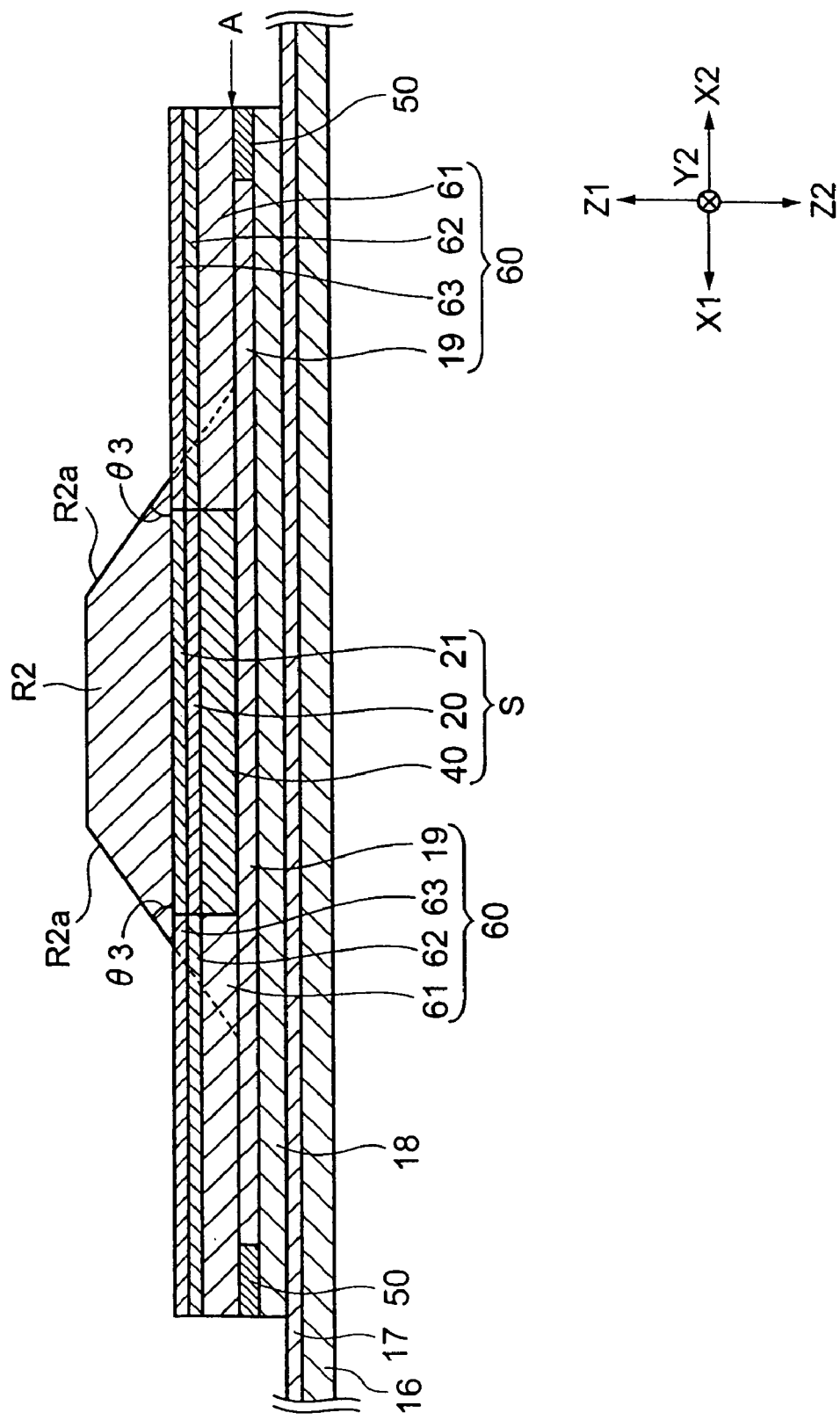
FIG. 11 is a diagram illustrating a process performed after the process illustrated in FIG. 10.

Next, as shown in FIG. 11, the resist layer R2 is formed continuously over a region ranging from the top surface of the laminator S to the top surfaces of the first insulating layers 60. At both sides of the resist layer R2, the inclined surfaces R2a, each of which has an inclined angle θ3 with respect to the top surface 60d of the first insulating layer 60, are formed. These inclined surfaces R2a can be formed by performing a heat treatment on the resist layer R2 or grinding the resist layer R2.

Figure 12:
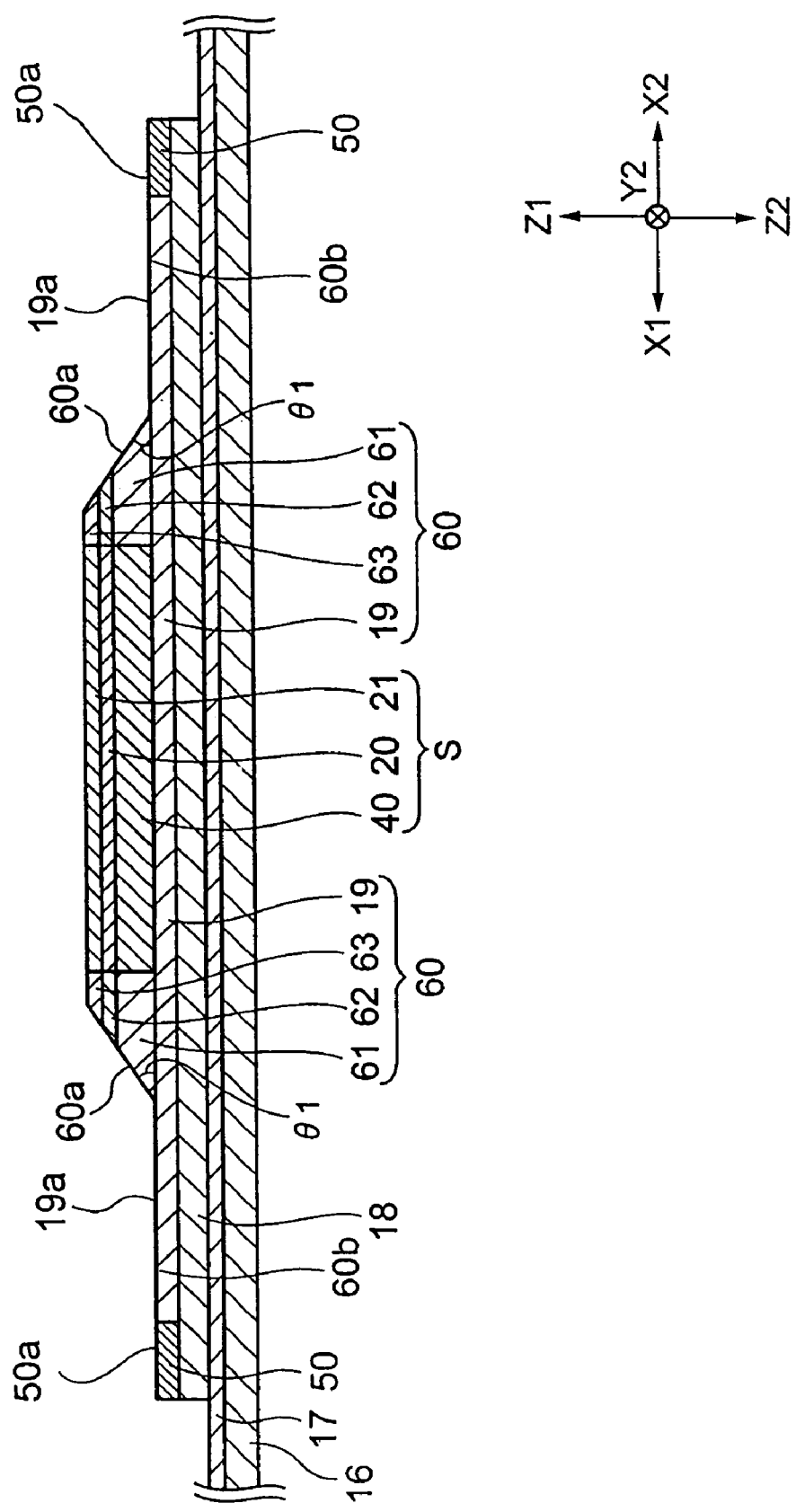
FIG. 12 is a diagram illustrating a process performed after the process illustrated in FIG. 11.

In addition, the first insulating layers 60 are ground up to portions shown by broken lines in the drawing. The grinding process can be performed by using a known method, such as an ion milling method or the like. As shown in FIG. 12, the grinding process of the first insulating layer 60 is performed until the top surface 19a of the first coil insulating layer 19 and the top surfaces 50a of the contact surfaces 50 are exposed. After the top surface 19a of the first coil insulating layer 19 and the top surfaces 50a of the contact surfaces 50 are exposed, the grinding process is completed. At this time, the top surface 19a of the first coil insulating layer 19 and the top surfaces 50a of the contact layers 50 form the planarized surface A.

When the first insulating layer 60 is ground, the inclined surface R2a is formed in the resist layer R2. Therefore, when the first insulating layer 60 is ground, the first insulator 61, the second insulator 62, and the third insulator 63 are ground along the extended line of the inclined surface R2a of the resist layer R2. In accordance with the inclined angle θ3, the first insulator 61, the second insulator 62, and the insulator 63 are ground such that the inclined surface 60a inclined at the inclined angle θ1 is formed downward (a direction of Z2 in the drawing) when they progress toward the lateral direction (a direction of X1 or X2 in the drawing).

In addition, as shown in FIG. 11, since the grinding process of the first insulating layer 60 is completed at the time when the top surface of the first coil insulating layer 19 is exposed, the top surface 19a of the first coil insulating layer 19 forms the flat surface 60b of the first insulating layer 60. Accordingly, the flat surface 60b of the first insulating layer 60 and the top surfaces 50a of the contact layers 50 form the planarized surface A.

FIG. 12 illustrates a state in which the first insulating layers 60 are ground in the above-described manner.

Figure 13:
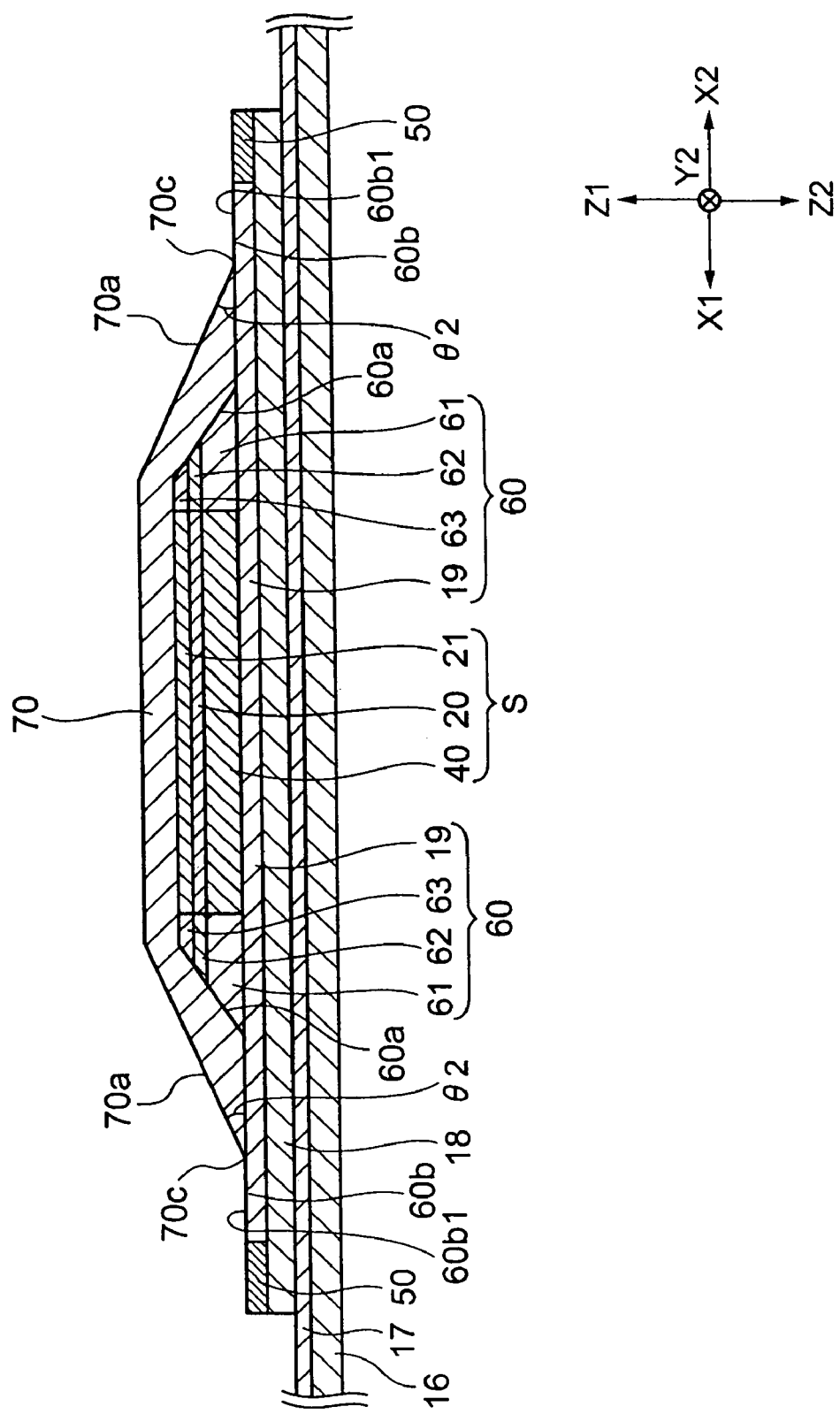
FIG. 13 is a diagram illustrating a process performed after the process illustrated in FIG. 12.

Next, as shown in FIG. 13, from the state illustrated in FIG. 12, the second insulating layer 70 is formed continuously over a region ranging from the top surface of the laminator S to the inclined surfaces 60a of the first insulating layers 60 and the top surfaces 60b1 of the flat surfaces 60b. The second insulating layer 70 can be formed by patterning an organic insulating material, such as a resist or the like, through the exposure and development processes.

The second insulating layer 70 is formed on the inclined surface 60a of the first insulating layer 60. Therefore, in the second insulating layer 70, formed are the inclined surfaces 70a each of which is inclined downward when progressing the lateral direction (a direction of X1-X2 in the drawing) and each of which is formed on the inclined surface 60a of the first insulating layer 60. At this time, as shown in FIG. 13, the bottom brim portion 70c of the inclined surface 70a of the second insulating layer 70 is formed such that it is located in the flat surface 60b of the first insulating layer 60. Since the bottom brim portion 70c is not located in the top surface 50a of the contact layer 50, even when the second insulating layer 70 is formed, the top surface of the contact layer is exposed. In addition, the inclined surface 70a is formed at the inclined angle θ2 with respect to the top surface 60b1 of the flat surface 60b of the first insulating layer 60.

At this time, the inclined angle θ2 of the second insulating layer 70 is made to be smaller than the inclined angle θ1 of the first insulating layer 60.

Figure 14:
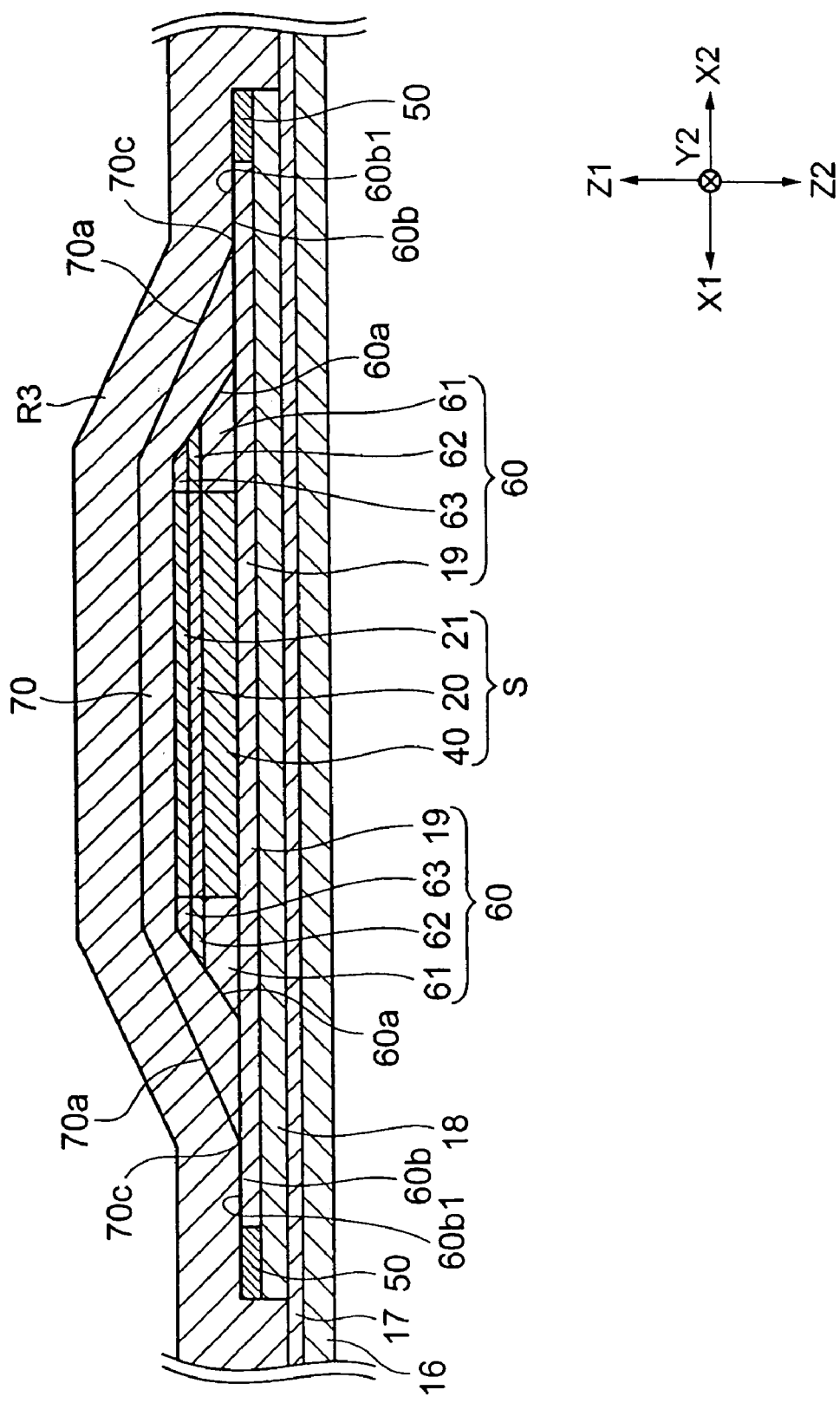
FIG. 14 is a diagram illustrating a process performed after the process illustrated in FIG. 13.
Figure 15:
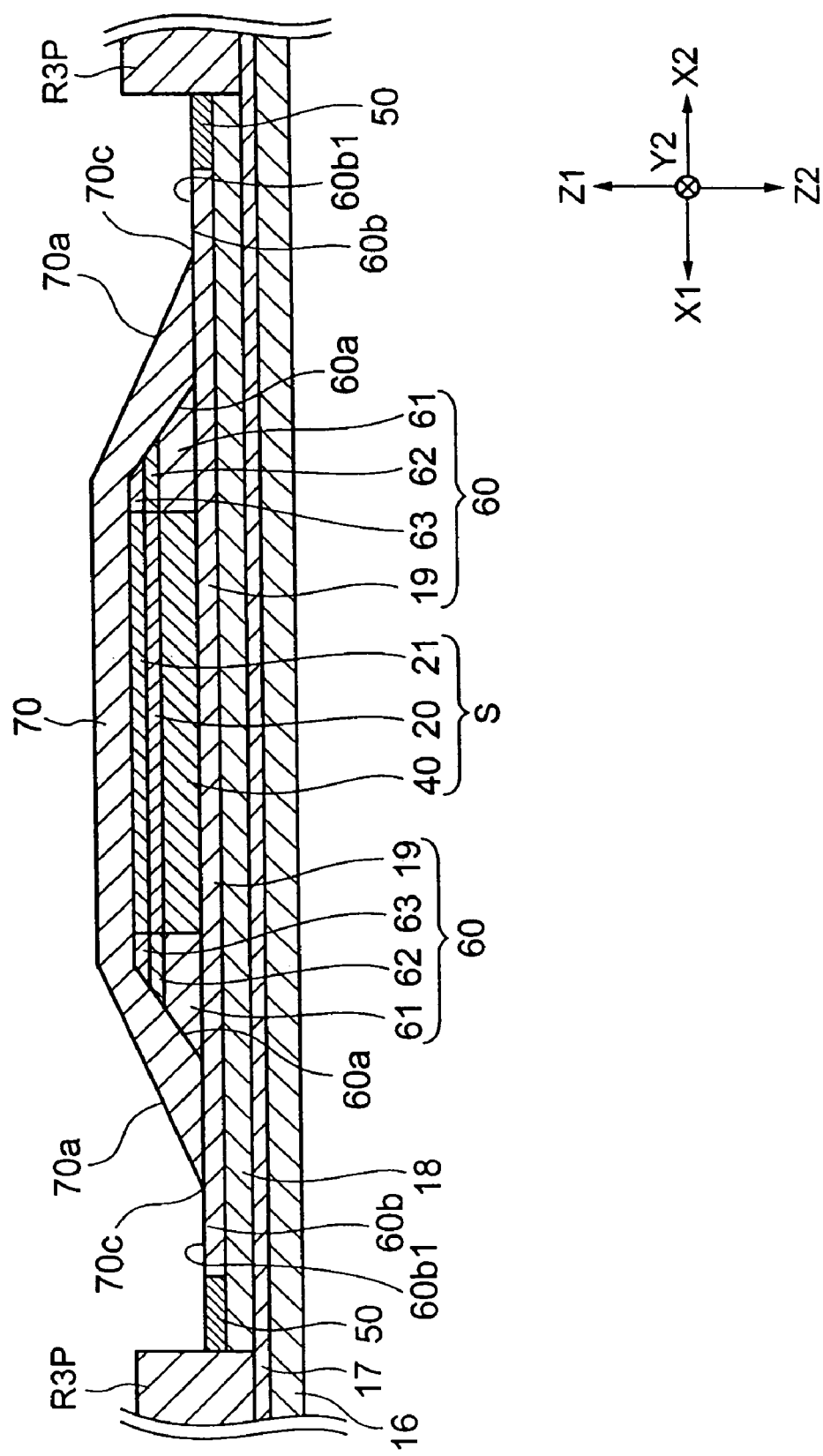
FIG. 15 is a diagram illustrating a process performed after the process illustrated in FIG. 14.

Next, as shown in FIG. 14, a plating base layer (not shown) is formed on the second insulating layer 70, and a resist layer R3 for forming the second coil layer 23 is formed on the plating base layer which is provided on the second insulating layer 70. And then, the resist layer R3 is exposed and developed so as to form resist patterns R3p for forming the second coil layer 23, as shown in FIG. 15.

Next, the plurality of second coil pieces 23a, which are disposed at predetermined intervals in the heightwise direction (a direction of Y2 in the drawing) (see FIG. 1), are formed on the plating base layer located between the resist patterns R3p, by means of a plating method or the like. The plurality of second coil pieces 23a are formed over a region ranging from the top surface of the second insulating layer 70 to the flat surface 60b of the first insulating layer 60 and the top surface 50a of the contact surface 50. This state is illustrated in FIG. 16.

Figure 16:
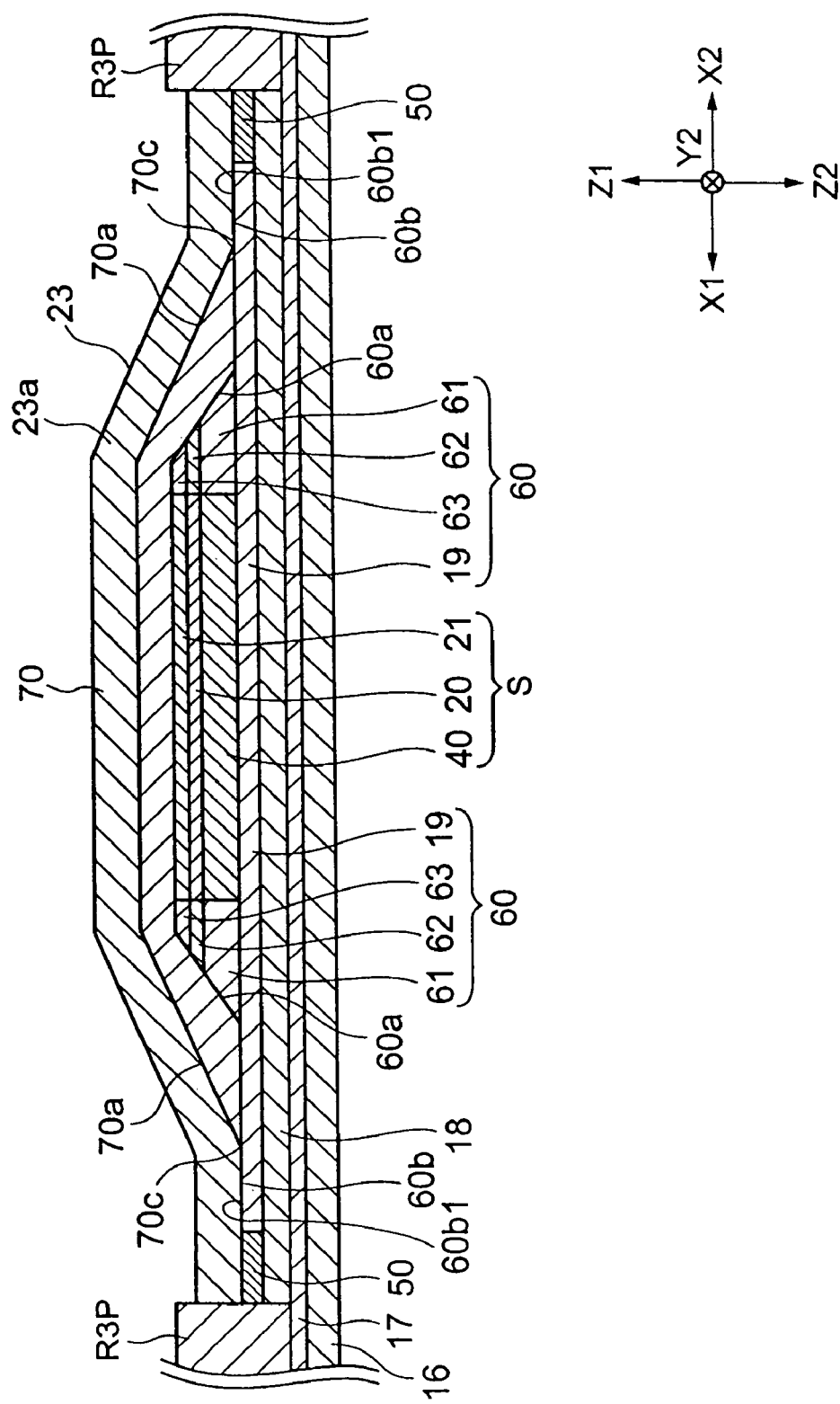
FIG. 16 is a diagram illustrating a process performed after the process illustrated in FIG. 15.

Next, if the resist patterns R3p are removed as shown in FIG. 16, the second coil layer 23 is formed which is composed of the plurality of second coil pieces 23a.

Next, if each of the Gd determining layer 28, the return path layer 27, and the protective layer 30 shown in FIG. 1 are formed by using a known method, it is possible to manufacture the perpendicular magnetic recording head H1 shown in FIG. 1.

According to the method of manufacturing the perpendicular magnetic recording head H1 according to this embodiment, in the process illustrated in FIG. 13, since the bottom brim portion 70c of the inclined surface 70a, which is formed in the second insulating layer 70, is formed so as to be located in the flat surface 60b of the first insulating layer 60, the inclined surface 70a can be formed at the inclined angle θ2 which is made to be smaller than that of the inclined surface 60a of the first insulating layer 60. Accordingly, in the process illustrated in FIG. 14, when the resist layer R3 is exposed and developed and the patterning process of the resist pattern R3p is performed in order to form the second coil layer 23, it is possible to suppress the diffused reflection of the light from occurring due to the exposure at the time of exposing and developing the resist layer at the inclined surface 70a.

Accordingly, the second coil layer 23 can be formed with high precision while preventing an abnormal shape from forming in the resist pattern R3p for forming the second coil layer 23. As a result, in the process illustrated in FIG. 16, it is possible to prevent a short circuit from occurring between the second coil pieces 23a while preventing an abnormal shape from forming in the second coil layer 23. Therefore, in the method of manufacturing the perpendicular magnetic recording head H1 according to this embodiment, it is possible to manufacture the perpendicular magnetic recording head H1 which has the second coil layer 23 with a superior coil peculiarity.

In addition, according to the method of manufacturing the perpendicular magnetic recording head H1, in the process illustrated in FIG. 11, the first inclined surface 60a is formed in the first insulating layer 60 which is located between the first coil layer 18 and the second coil layer 23. In addition, in the process illustrated in FIG. 16, a lateral region of the second coil layer 23 extends downward (a direction of Z2 shown in FIG. 3) along the inclined surface 70a of the second insulating layer 70 (formed by the process illustrated in FIG. 13) which is formed on the inclined surface 60a. Therefore, the second coil layer 23 can be electrically connected to the first coil layer 18 through only the contact layers 50.

Accordingly, when being compared with a structure in which the same layers as the auxiliary yoke layer 40, the main magnetic pole layer 20, and the gap layer 21 for constructing the laminator S are formed between the first coil layer 18 and the second coil layer 23, and the first coil layer 18 and the second coil layer 23 are connected to each other through the same layers, an electrical resistance is minimally suppressed between the first coil layer 18 and the second coil layer 23. Therefore, in the method of manufacturing the perpendicular magnetic recording head H1, a superior coil peculiarity can be obtained.

In addition, since the flat surface 60b of the first insulating layer 60 and the top surfaces 50a of the contact layers 50 form the planarized surface A, the lateral region of the second coil layer 23 can be formed in the planarized surface A, and the second coil layer 23; can be surely connected to the contact layers 50.

The invention claimed is:

1. A perpendicular magnetic recording head comprising:
a first coil layer that has a plurality of first coil pieces which extend in a track width direction and are placed in a direction crossing the track width having a predetermined intervals in between;
a second coil layer that has a plurality of second coil pieces which extend in the track width direction and are formed in a direction crossing the track width having a predetermined intervals in between, the second coil layer being formed above the first coil layer;
contact layers each of which electrically connects the first coil layer to the second coil layer; and
a laminator that has a main magnetic pole layer and a gap layer which are formed between the first coil layer and the second coil layer and above a region between the contact layers, wherein first insulating layers are formed at both sides of the laminator, a second insulating layer is formed on a region ranging from a top surface of the laminator to top surfaces of the first insulating layers and below the second coil layer, an inclined surface and a flat surface that is continuous to the inclined surface are formed in each of the first insulating layers, the inclined surface being inclined downward when progressing toward a lateral direction, in the second insulating layer, each of the inclined surfaces inclined downward when progressing toward the lateral direction is formed on the inclined surface of the first insulating layer, and a lateral region of the second coil layer extends downward along each of the inclined surfaces of the second insulating layers, and an inclined angle θ1 of the inclined surface of the first insulating layer with respect to the flat surface is larger than an inclined angle θ2 of the inclined surface of the second insulating layer with respect to the flat surface.

2. The perpendicular magnetic recording head according to claim 1, wherein an upper side of the flat surface of the first insulating layer and a top surface of the contact layer form a planarized surface.

3. The perpendicular magnetic recording head according to claim 2, wherein a bottom brim portion of the inclined surface of the second insulating layer is located in the planarized surface.

4. The perpendicular magnetic recording head according to claim 1, wherein the inclined angle θ1 of the inclined surface of the first insulating layer with respect to the flat surface is within a range of 55° to 70°.

* * * * *